US012748891B2

(12) United States Patent
Chen

(10) Patent No.: US 12,748,891 B2
(45) **Date of Patent: *Sep. 29, 2026**

(54) METHODS AND SYSTEMS FOR SUBJECT INFORMATION DATA CLEANSING AND MANAGEMENT USING MACHINE LEARNING

(71) Applicant: CareerCraft, Inc., Austin, TX (US)

(72) Inventor: Yeeland Chen, Austin, TX (US)

(73) Assignee: CareerCraft, Inc., Austin, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/961,056

(22) Filed: Nov. 26, 2024

(65) Prior Publication Data

US 2025/0094635 A1 Mar. 20, 2025

Related U.S. Application Data

(63) Continuation of application No. 17/876,496, filed on Jul. 28, 2022, now Pat. No. 12,164,671.

(60) Provisional application No. 63/231,910, filed on Aug. 11, 2021.

(51) Int. Cl.

| | |
|---|---|
| ***G06F 21/62*** | (2013.01) |
| ***G06F 21/57*** | (2013.01) |
| ***G06N 20/00*** | (2019.01) |

(52) U.S. Cl.
CPC .......... *G06F 21/6254* (2013.01); *G06F 21/57* (2013.01); *G06N 20/00* (2019.01)

(58) Field of Classification Search
CPC ..... G06F 21/6254; G06F 21/57; G06N 20/00; G06N 5/048
See application file for complete search history.

(56) References Cited

U.S. PATENT DOCUMENTS

| | | | | |
|---|---|---|---|---|
| 2008/0313165 | A1* | 12/2008 | Wu | G06Q 30/02 707/999.005 |
| 2009/0254511 | A1 | 10/2009 | Yeap et al. | |
| 2016/0034949 | A1* | 2/2016 | Dowling | G06Q 30/0248 705/14.47 |
| 2016/0055302 | A1* | 2/2016 | Sellars | G16Z 99/00 705/3 |
| 2018/0232357 | A1* | 8/2018 | Beller | G06F 40/284 |
| 2019/0171704 | A1* | 6/2019 | Buisson | G06F 16/3325 |

(Continued)

FOREIGN PATENT DOCUMENTS

AU 2020102129 10/2020

*Primary Examiner* — Mohammad W Reza
(74) *Attorney, Agent, or Firm* — Campbell Stephenson LLP

(57) ABSTRACT

Methods and systems are disclosed that provide for the data cleansing and management of subject information, using machine learning. Such methods and systems include receiving subject information (where the subject information is raw data and comprises received identifying information and received subject data for a subject), producing cleansed subject information, identifying the subject as an identified subject (based, at least in part, on the cleansed subject information), and, in response to a determination that the subject is the identified subject, associating the received subject data with a subject record of the identified subject in the subject information system database, comprising importing at least a portion of the received subject data into the subject information system database.

23 Claims, 22 Drawing Sheets

(56) References Cited

U.S. PATENT DOCUMENTS

| | | | | |
|---|---|---|---|---|
| 2022/0067427 | A1* | 3/2022 | Stewart | G06N 5/048 |
| 2022/0157063 | A1* | 5/2022 | Bronicki | G06Q 30/014 |
| 2023/0005075 | A1* | 1/2023 | Li | G06F 18/22 |

* cited by examiner

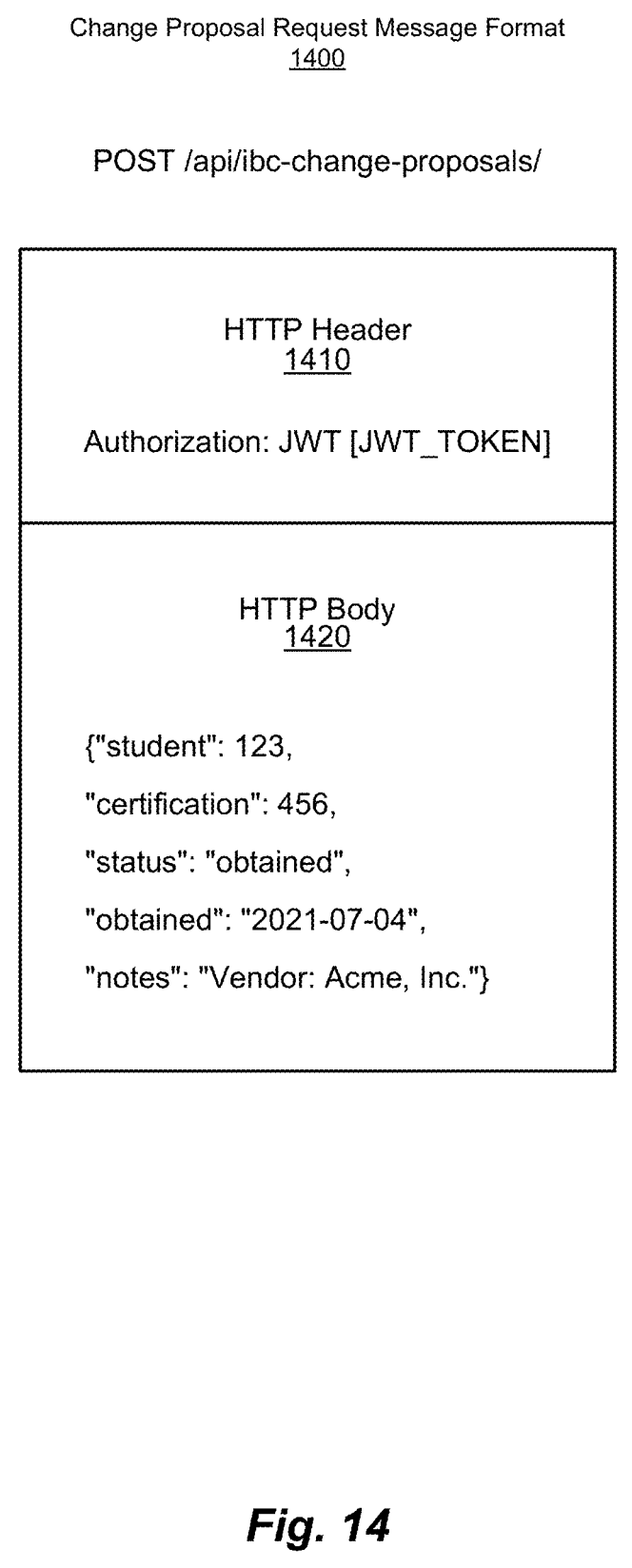

Change Proposal Request Message Format
1400

POST /api/ibc-change-proposals/

HTTP Header
1410

Authorization: JWT [JWT_TOKEN]

HTTP Body
1420

{"student": 123,
"certification": 456,
"status": "obtained",
"obtained": "2021-07-04",
"notes": "Vendor: Acme, Inc."}

*Fig. 14*

Factor Ranking System
1700

METHODS AND SYSTEMS FOR SUBJECT INFORMATION DATA CLEANSING AND MANAGEMENT USING MACHINE LEARNING

CROSS-REFERENCE TO RELATED APPLICATIONS

The present patent application is a continuation of U.S. patent application Ser. No. 17/876,496, entitled "Methods and Systems for Subject Information Data Cleansing and Management Using Machine Learning," filed Jul. 28, 2022, having Y. Chen as inventor, and which claims benefit under 35 U.S.C § 119(e) of Provisional Patent Application No. 63/231,910, filed on Aug. 11, 2021, entitled "Methods and Systems for Subject Information Management," and having Y. Chen as inventor. The above-referenced applications are hereby incorporated by reference herein, in their entirety and for all purposes.

FIELD OF THE INVENTION

The present disclosure relates to subject data management, and more particularly, to methods and systems that provide for the data cleansing and management of subject information, using machine learning.

BACKGROUND OF THE INVENTION

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies, generally, the figure in which the reference number first appears. The same reference numbers in different figures indicate similar or identical items.

FIG. 14 is a simplified block diagram illustrating an example of a change proposal request message format, according to methods and systems such as those disclosed herein.

Figure 1:
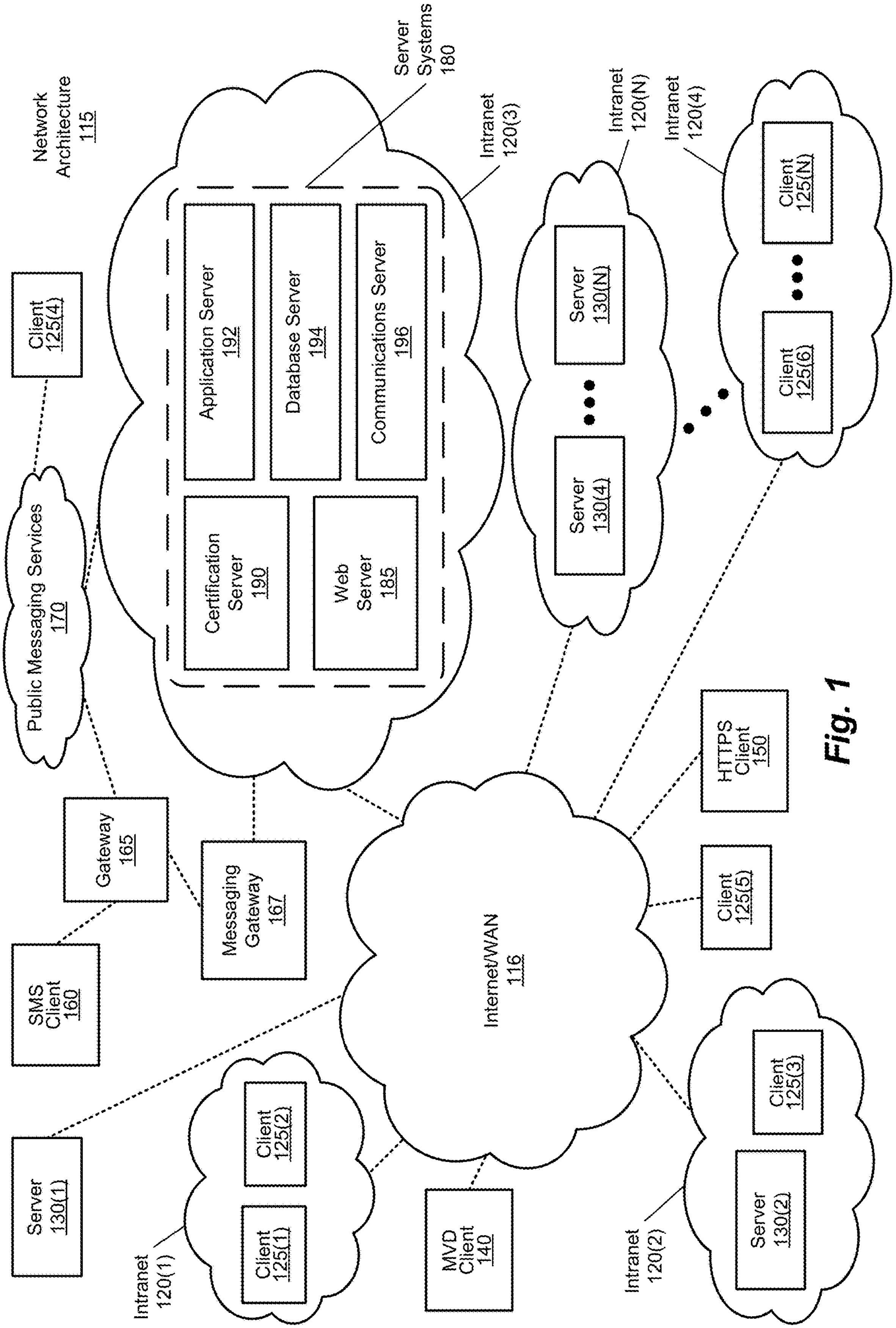
FIG. 1 is a block diagram illustrating an example of a network architecture, according to methods and systems such as those disclosed herein.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover modifications, equivalents and alternatives falling within the spirit and scope of methods and systems such as those described herein, as defined by the appended claims.

DETAILED DESCRIPTION

The following is intended to provide a detailed description of an example of the invention and should not be taken to be limiting of the invention itself. Rather, any number of variations may fall within the scope of the invention, which is defined in the claims following the detailed description.

Introduction

Methods and systems such as those described herein provide the ability to validate, track, and manage information regarding one or more subjects (e.g., subjects in clinical trials, employees, students, job applicants, and so on) for purposes of validating information regarding one or more metrics (e.g., results of medication administration, job performance metrics, certifications, scholastic accomplishments, test results, credentials, endorsements, and so on) of those subjects. To simplify the discussions presented below, examples of such functionality are presented in terms of certifications, test results, and other such metrics, for student subjects. As will be appreciate in light of the present disclosure, such functionalities and comparable functionalities apply with equal advantage to other contexts, such as those just listed.

Embodiments of the present disclosure can be implemented as software, hardware, or a combination thereof. For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Certain implementations of methods and systems such as those described herein are applicable to educational organizations (e.g., schools), allowing such educational organizations to increase their capacity with regard to having students participate in work-based learning experiences, qualifications, certifications, and other types of college, career, and military preparedness, and maintain a record of their students efforts in this regard.

Such implementations can be used in a number of areas, but provide particular advantage in at least three different domains:

1. Data Tracking & Insights
2. Program Operations
3. Student Experiences (features that enhance a student's internship or help them discover careers that they may want to pursue)

For Data Tracking & Insights, implementations such as those described herein can provide data tracking for CCMR (College, Career, and Military Readiness tracking), as measured by a given educational supervisory administration. In such scenarios, much of the activity that contributes to accountability for CCMR also contributes to other accountability metrics for various programs that such organizations may offer (e.g. Pathways in Technology Early College High Schools (P-TECH) programs, Early College High School (ECHS) programs, and other such programs). A valuable aspect of methods and systems such as those described herein is a dashboard system that allows subjects (e.g., students), faculty, administrators, counselors, and other such parties to determine subjects' progress and accomplishments with the relevant metrics, while also being able to examine such information in greater detail (referred to colloquially as "drilling down") to see what achievements individual students have attained. The ability to quickly and efficiently organize and present such information is of great advantage in educational settings (e.g., the inability to determine and improve a given student's overall accountability score is of little use if the student has already graduated). Further, locally-maintained records (if any) tend to be disorganized and ad hoc, which are unable to provide the requisite functionality, much less in a timely and efficient manner. Further still, with regard to data integrity (the maintenance of valid and verifiable data), the trustworthiness and reliability of locally-maintained data is only as good as the personnel maintaining the information. Not only do methods and systems such as those described herein offer mechanisms that allow such organizations to act on real-time data, but such methods and systems also provide checks and balances (e.g., evidence-based record keeping). This ensures not only that such organizations can trust the data thus maintained, but in the case of an external audit, there are no questions as to the validity of data, as the organization has the evidence and audit trail to substantiate its records.

In sum, salient aspects of methods and systems such as those described herein include:

1) Real-Time Subject Activity Tracking
2) Subject Record History
3) Checks and Balances (through Evidence-Based Record Keeping)
4) Metrics Dashboards Thus, methods and systems such as those described herein are able to address the needs of organizations needing to track subjects' qualifications, certifications, and the like, in a fast, efficient, and verifiable manner, by way of such methods' and systems' data cleansing, data tracking, record substantiation, and audit trail functionalities.

Example System Network Architecture

FIG. 1 is a block diagram illustrating an example of a network architecture 115 that includes a server system according to one embodiment. Network architecture 115 includes an internetwork (depicted in FIG. 1 as an internet/wide area network (WAN) 116), which is configured to couple a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described in subsequently. Internet/WAN 116 thus communicatively couples intranets 120(1)-(N) to one another, thereby allowing clients 125(1)-(N) and servers 130(1)-(N) to communicate with one another (and can, in certain embodiments, provide for the servers of intranets 120(3) and 120(N), for example, to operate as cloud-based server systems). As is depicted in FIG. 1, clients 125(1)-(N) can be communicatively coupled to one another and to servers 130(1)-(N) as part of one of intranets 120(1)-(N), or directly via internet/WAN 116. Similarly, servers 130(1)-(N) can be coupled via intranet/WAN 116 via a direct connection to intranet/WAN 116, or as part of one of intranets 120(1)-(N).

Network architecture 115 also provides for communication via intranet/WAN 116 using one or more other devices. Such devices can include, for example, a mobile voice and data (MVD) device (e.g., depicted in FIG. 1 as a MVD client 140, implemented in a "smart phone," a "tablet" computer, or other such mobile computing device, using, in the alternative or in combination, general packet radio service (GPRS) technology, 3$^{rd}$ Generation (3G) cellular technology (e.g., Wideband Code Division Multiple Access (WCDMA)/High-Speed Downlink Packet Access (HSDPA)), 4$^{th}$ Generation (4G) cellular technology (e.g., High Speed Packet Access (HSPA/HSPA+), Long Term Evolution (LTE), or IEEE 802.16 ("WiMAX")), and/or 5$^{th}$ Generation (5G) cellular technology (New Radio (NR), Stand Alone (SA), or ultra-wideband (UWB)), among other such communications technologies), a secure web client (depicted in FIG. 1 as a secure hypertext transfer protocol client 150), and a basic cellular phone (e.g., using standard texting or other communication protocols, and depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 116 via several channels. SMS client 160 can communicate directly, for example, with a gateway 165, which, in turn, communicates with internet/WAN 116 via a messaging gateway 167 and, optionally, elements within intranet 120(3), for example. Alternatively, SMS client 160 can, via gateway 165, communicate with intranet 120(3) (and so, internet/WAN 116) via public messaging services 170 to which gateway 165 and intranet 120(3) are connected. As is also depicted in FIG. 1, a client 125(4) is also able to communicate via internet/WAN 116 by way of public messaging services 170 and intranet 120(3). In order to support such communications, as well as other communications according to various embodiments, intranet 120(3) includes server systems 180, as well as (optionally) providing for a number of clients (not shown), in the manner of intranet 120(2). As will be appreciated in light of the present disclosure, such communications pathways can include (and are intended to comprehend) wired network connections (e.g., within an intranet such as one of intranets 120, or therebetween) and/or wireless network paths that include wireless communications (e.g., by way of wireless devices supporting IEEE 802.11 technology ("WiFi")). Further, with respect to the use of a combination of hardware and software in managing such communications, the associated computational workloads can be orchestrated such that those computational workloads are serviced at a point in the network that is physically and/or logically closer to the given user's device (or, in scenarios in which computational workloads can be divided, to points as close to that user's device as such orchestration of the given portion of the conversational workload will allow).

Server systems 180 include a number of components that allow server systems 180 to provide various functionalities (e.g., supporting various communications, web-based services, cloud-based services, enterprise services, and so on). Among these components, in certain embodiments, are a number of servers, which can be implemented in hardware and/or software. Server systems 180 includes a number of elements that allow server system 180 to support subject record modification, updating, review, tracking, maintenance, and other functionalities according to embodiments of the present invention. Among these elements are one or more web servers (e.g., a web server 185), one or more subject information servers (e.g., a certification server 190), one or more application servers (e.g., an application server 192), one or more database servers (e.g., a database server 194), and one or more communications servers (e.g., a communications server 196), among other possible such servers, in communication with one another. In the manner noted above, a distributed approach to the servers of server systems 180 can employ the aforementioned orchestration, such that each such server portion thereof is executed as a distributed application, with the orchestration thereof migrating such portions as may be advantageous to service the users' needs efficiently and effectively. For example, an instance of one or more of the servers of server systems 180 (and/or portions thereof) might be migrated to server 130(2) in order to better address the needs of a user employing a subject information application executed by client 125(3).

Servers such as those included in server systems 180 are designed to include hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with subsequent figures, the server systems of server systems 180 provide such functionality, for example by presenting end-users with a website (functionality effected by, for example, web server 185). In so doing, such web servers present information collected, generated, organized, and maintained in one or more distributed databases (DDB) and/or one or more unstructured databases, by one or more distributed database servers such as database server 194, under the control of one or more application servers. Such a website can be accessed by an end-user using a client computing device such as one or more of clients 125(1)-(N), MVD client 140, HTTPS client 150, and/or SMS client 160. As will be appreciated in light of the present disclosure, the ability to support such functionality on mobile devices such as those described herein is of importance, as mobile communications and program management are fast becoming an important facet of today's business environment.

It will be appreciated that, in light of the present disclosure, variable identifiers such as "N" or "M" may be used in various instances in various of the figures herein to more simply designate the final element of a series of related or similar elements. The repeated use of such variable identifiers is not meant to necessarily imply any sort of correlation between the number of elements in such series. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Further, in light of the present disclosure, it will be appreciated that storage devices such as storage devices 160 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, such systems can include other components such as routers, firewalls, load balancers, and the like that are not germane to the discussion of the present disclosure and will not be discussed further herein. It will also be appreciated that other configurations are possible.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with this disclosure.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment. With regard to the servers described in connection with FIG. 1 and the potential of distributed processing, there exists the potential for employing distributed, multiple servers to achieve computational concurrency. This presents the possibility of each user of a client such as those described herein for purposes of participating in the validation, tracking, maintenance, and management of subject information.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Example Architectures for Certification Information Management Systems

Figure 2A:
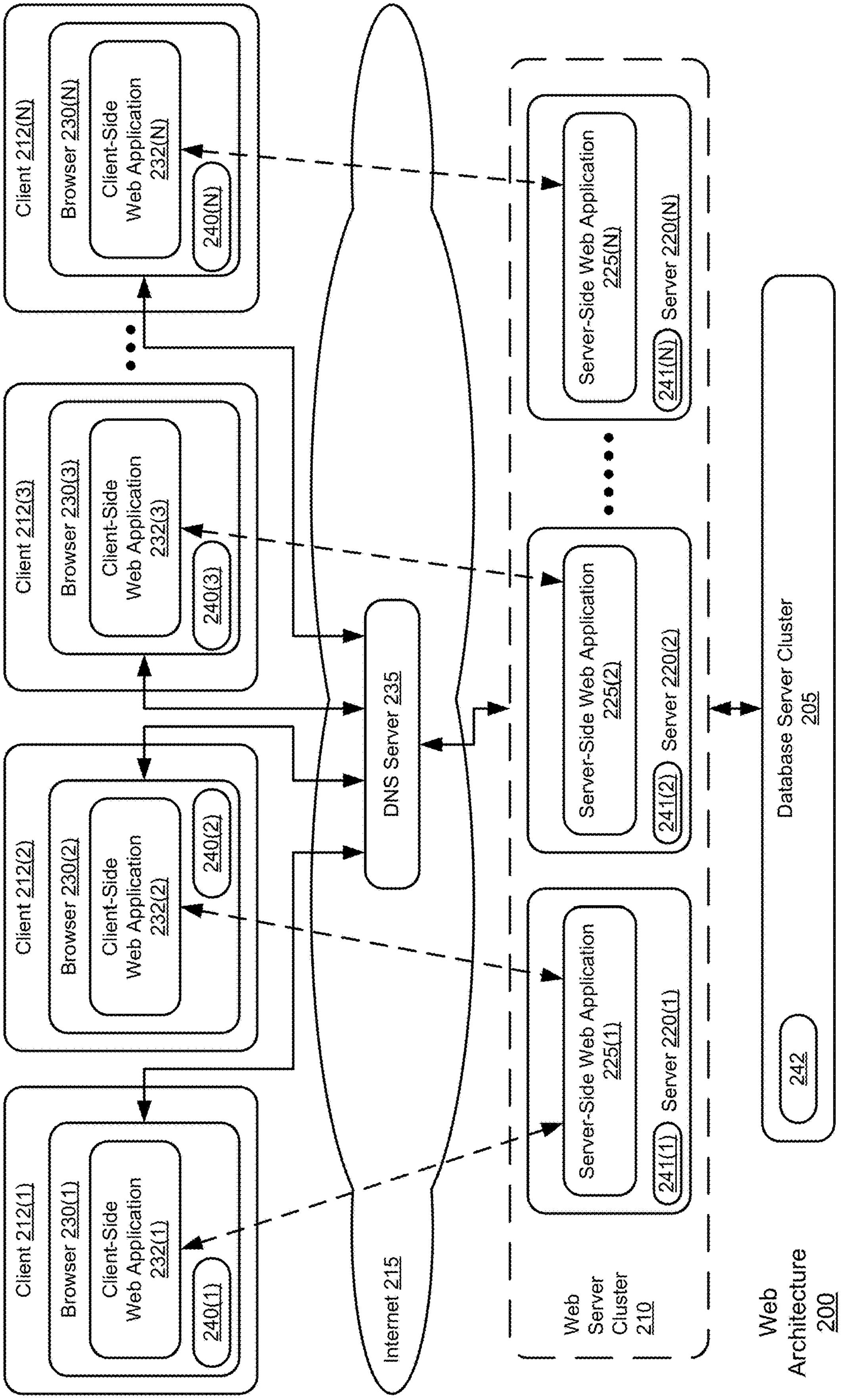
FIG. 2A is a block diagram illustrating an example of a client-server architecture, according to methods and systems such as those disclosed herein.

FIG. 2A is a block diagram illustrating an example of a client-server architecture supporting a messaging architecture according to embodiments of the present invention. FIG. 2A depicts a web architecture 200 that includes a database server cluster 205, a web server cluster 210, and a number of clients (depicted in FIG. 2A as clients 212(1)-(N)) communicatively coupled to web server cluster 210 by an internetwork (depicted in FIG. 2A as internet 215). As will be appreciated in light of the present disclosure, a server cluster is a group of independent servers that can be managed as a single system, and so provide higher availability, easier manageability, and greater scalability. In the present scenario, database server cluster 205 is a server cluster providing database facilities, which is architected using clustering techniques. In so doing, database server cluster 205 is able to provide advantages such as load balancing, high availability, and the like, by breaking up the data to be accessed by the servers of database server cluster 205 (e.g., breaking a database into "shards"), by allowing separate data sources to be accessed separately, and so on. Similarly, web server cluster 210 is a group of computer systems executing web server software (e.g., HTTP servers) that collectively provide a web page delivery mechanism, with advantages comparable to those noted above.

In turn, web server cluster 210 includes a number of servers 220(1)-(N), each of which support one or more server-side web applications (depicted in FIG. 2A as server-side applications 225(1)-(N)). As noted, clients 212(1)-(N) access servers 220(1)-(N) via internet 215. More specifically, each of clients 212(1)-(N) support one or more browsers (depicted in FIG. 2A as browsers 230(1)-(N), and referred to in the aggregate as browsers 230; which, in turn, each support one or more client-side web applications (depicted in FIG. 2A as client-side web applications 232(1)-(N)). Each of client-side web applications 232(1)-(N) is configured to communicate with one or more of server-side web applications 225(1)-(N), as is depicted in FIG. 2A.

In order to support such communications, browsers 230 (1)-(N) can be configured to access one or more servers of web server cluster 205 via internet 215, and more specifically, by accessing a Domain Name System (DNS) server 235. A DNS is a hierarchical, distributed naming system for computers, services, and other resources connected to a network supporting DNS (e.g., the Internet or a private network). A DNS associates various information with domain names assigned to each of the participating entities. For example, browser 230(3) on client 212(3) can access DNS server 235 in order to determine an internet protocol (IP) address of server 225(2). Use of a DNS also allows for load balancing, referred to as DNS balancing.

DNS balancing is an efficient mechanism for implementing a web site that can process more web traffic than might otherwise be the case. DNS balancing involves executing multiple copies of the site on separate physical servers. The DNS server for the hostname of the site is configured to direct access requests such that different access requests are directed to different ones of those servers. This can be accomplished in a number of ways, such as by having the DNS server return more than one internet protocol (IP) address for the hostname (e.g., return multiple IP addresses for the site, from which the requesting browser can choose) or returning a different IP address for each DNS request received, for example. In any event, this results in the distribution of accesses across the web servers of web server cluster 210, although from the perspective of a given one of browsers 230(1)-(N), there is only one web site. Alternative approaches for load balancing include, for example, techniques such as round-robin DNS balancing, hardware-based load balancing, software-based load balancing, reverse proxying, content spreading across hosts, content spreading across outsourced providers, and other such techniques.

Once browser 230(3) is in communication with server 220(2), client-side web application 232(3) is then able to communicate with server-side web application 225(2). In so doing, client-side web application 232(3) and server-side web application 225(2) are able to access information stored in one or more of the databases maintained in database server cluster 205. In certain embodiments, client-side web applications 232(1)-(N) can be implemented as an AJAX client (a client supporting an Asynchronous JavaScript and XML (AJAX) framework). AJAX is a group of interrelated web development techniques used on the client-side to create asynchronous web applications. Such client-side web applications can be implemented in JavaScript and extensible markup language (XML) using related web development techniques, including jQuery and Java Script Object Notation (JSON). jQuery is a cross-browser Java Script library designed to simplify the client-side scripting of hypertext markup language (HTML), while JSON is a lightweight, text-based open standard design for human-readable data interchange. On the server side, server-side web applications 225(1)-(N) can be implemented, for example, using any number of approaches for such server-side support (e.g., including Java, C # and .NET, Ruby on Rails, the PHP Hypertext Processor (or more simply, PHP) scripting language, and/or other such technologies, typically some manner of a general-purpose server-side scripting language). As will be discussed subsequently, embodiments of the present invention can take advantage of the aforementioned mechanisms and facilities, in order to provide additional advantages in their implementation.

In the context of a subject information handling system according to embodiments of the present invention, a web architecture such as web architecture 200 can support various features of such a subject information handling system using a number of mechanisms. For example, support for transitioning communications (e.g., between one or more of clients 212 and various ones of servers 220) between those and/or others of servers 220 can be provided by the maintenance of information (e.g., information maintained on a computer system as a type of "cookie" or other small amount of data, sent from a website and stored for access by a web browser), which is depicted in FIG. 2A as a number of cookies (depicted in FIG. 2A as cookies 240(1)-(N), and referred to in the aggregate as cookies 240). Cookies 240 maintain information regarding the state of a given communications session (or multiple such sessions), allowing the communications session(s) to be passed from one server to another, and thus, facilitating load balancing and failure recovery. Such load balancing and failure recovery can be of significant advantage in subject information handling systems, where the fast, efficient provision of services such as those described herein is needed, and the ability to safely maintain subject information for purposes of audits and verification of achievements is mandatory.

Alternatively, state information for such communications can be kept on the server side (e.g., at one of servers 220(1)-(N) (depicted in FIG. 2, e.g., as server-side state information 241(1)-(N))), or maintained in a database used to support the subject information handling system (e.g., communication and state information can be maintained in a database in database server cluster 205 (depicted in FIG. 2, e.g., as a communication information database 242)). Server-side maintenance of such information and management thereof can be managed by a particular server tasked with this responsibility, or can be shared among servers (and/or transferred between servers). Another alternative is to configure the DNS server (e.g., DNS server 235) to manage the messaging sessions by sending accesses to different servers (e.g., the selection of one or more certain URLs/links can be sent to one server, while the selection of other URLs/links are sent to another server; DNS server 235 can be configured to send such accesses to various ones of servers 205(1)-(N) according to a round-robin (or other) scheduling paradigm, or by way of some other comparable mechanism). As will be appreciated in light of the present disclosure, the functionalities provided by a subject information handling system according to embodiments of the present invention support the implementation of a wide array of features that allow users to interact with such information in a particularly effective and efficient manner.

Figure 2B:
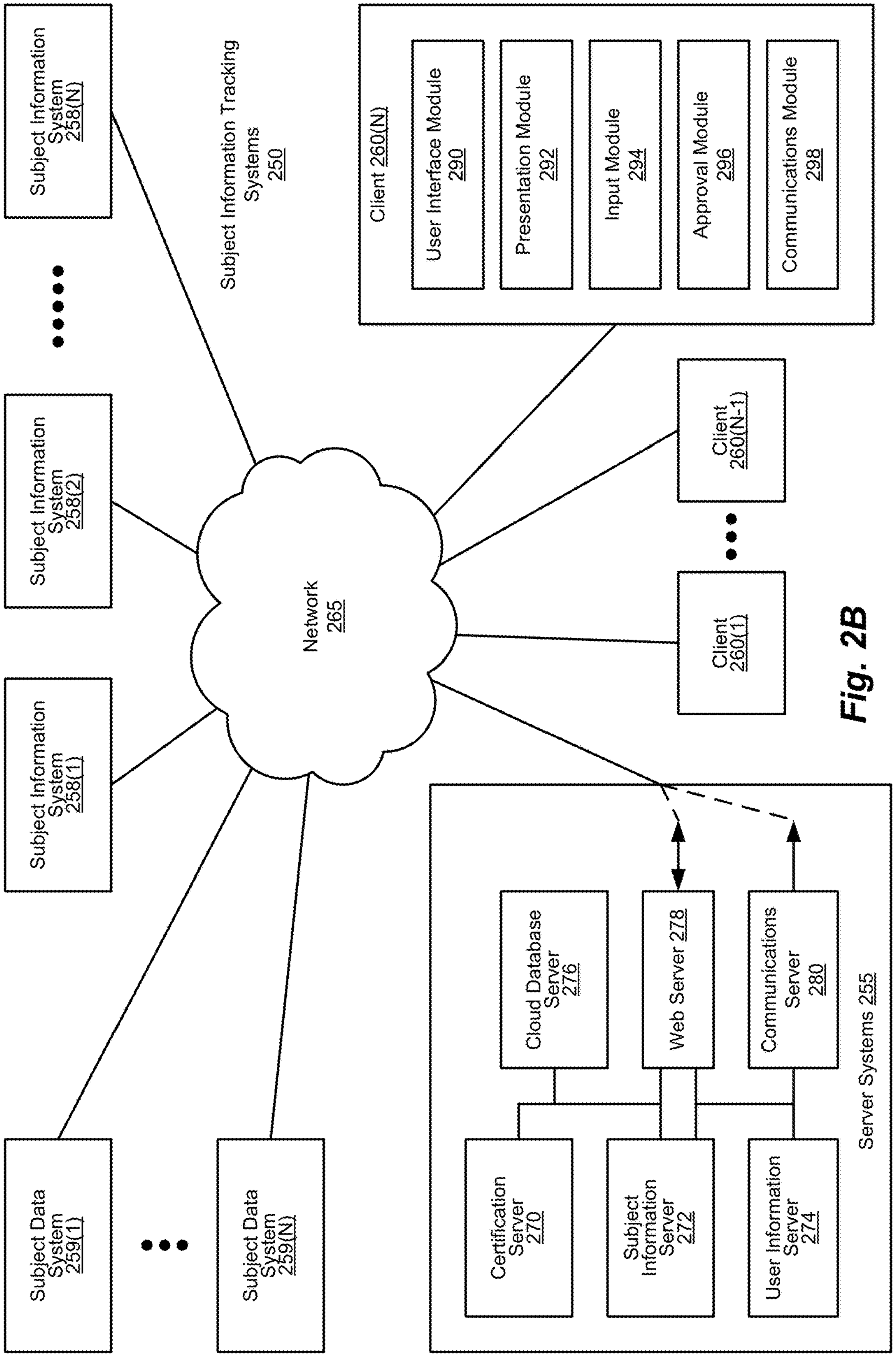
FIG. 2B is a block diagram illustrating an example of subject information tracking systems, according to methods and systems such as those disclosed herein.

FIG. 2B is a block diagram illustrating an example of subject information tracking systems, according to methods and systems such as those disclosed herein. To this end, FIG. 2B depicts subject information tracking systems 250 (also referred to herein as a Certification Management System Architecture (CMSA)). Subject information tracking systems 250 includes a number of server systems (depicted in FIG. 2B as server systems 255), which are, in certain embodiments, comparable in various aspects to one or more of the servers of server systems 180 depicted in FIG. 1. Also included in subject information tracking systems 250 are a number of subject information systems (depicted in FIG. 2B as subject information systems 258(1)-(N), such as testing authority systems that manage, maintain, and provide students' test results for various standardized tests, for example), a number of subject data systems (depicted in FIG. 2B as subject data systems 259(1)-(N), such as state, district, and school IT systems that maintain information for students and/or certification provider systems that provide certifications for students), and a number of clients (depicted in FIG. 2B as clients 260(1)-(N)).

Server systems 255, subject information systems 258, and clients 260 are communicatively coupled to one another via a network 265 (e.g., a wide area network such as the Internet). In turn, server systems 255 include a number of servers that provide a variety of functions in support of the facilities provided by subject information tracking systems 250. In one embodiment, such servers include a certification server 270, a subject information server 272, a user information server 274, a database server 276, a web server 278, and a communications server 280. As will be appreciated in light of the present disclosure, and more specifically, with regard to the descriptions of the methods and systems presented herein, one or more characteristics and/or metrics are provided by one or more of subject information systems 258, the results for which are maintained by certification server 270. Similarly, such characteristics and/or metrics can be updated by way of clients 260. Clients 260 interact with database server 276 in order to effect management of such information. Interactions between subject information systems 258 and clients 260 with their respective servers of server systems 255 are, in certain embodiments, effected via network 265 and web server 278. For example, users of subject information systems 258 can access certification server 270 via web server 278, while users of clients 260 can access database server 276 via web server 278. Users of clients 260 can also access subject information server 272 and user information server 274 via web server 278, and are thereby able to submit change proposals and review such change proposals. To this end, subject information server 272 interacts with communications server 280, in order to identify the appropriate one(s) of subject information systems 258, and communicate the relevant digital information therewith. In this regard, users of clients 260 can also access user information server 274 via web server 278, in order to provide their information, subject information, substantiating information, and other information relevant to the certification of subjects. It will be appreciated that such an architecture is advantageous, in certain implementations, as a result of its separation of access to information in certification server 270 and subject information server 272, and subject information server 272 and user information server 274. In separating such access, users given access to certification server 270 and subject information server 272 need not be given access to user information server 274, and users given access to subject information server 272 and user information server 274 need not be given access to certification server 270. This demonstrably improves the security of such systems, as user access can be limited to those systems a user has the need to access, while providing fast, efficient access to such systems. As will be appreciated in light of the present disclosure, other combinations of access can be supported by architecting such server systems in this manner.

In light of the foregoing, the communication paths between various servers are depicted in FIG. 2B as supporting communications between ones of subject information systems 258 and web server 278, and ones of clients 260 and web server 278. In the example depicted in FIG. 2B, web server 278, in turn, is depicted as being in communication with two groups of servers. The first of these groups is certification server 270, database server 276, and subject information server 272, and web server 278 is configured to support communications between these servers and subject information systems 258/clients 260. Web server 278 also provides for communications between ones of clients 260 and various other servers, including, for example, subject information server 272, user information server 274, and communications server 280. As will be appreciated in light of the present disclosure, while such communications paths are depicted in the foregoing manner, such an architecture is merely an example of such communications paths. Any number of alternatives are possible in this regard, and are intended to come within the scope of the present disclosure. In dividing access in this manner, the servers of subject information tracking systems can be grouped (or otherwise organized) through architectural features that prevent unauthorized access to information based simply on the inability to communicate with servers with which the given user is not permitted to communicate.

Subject information systems such as subject information systems 258 include a number of modules supporting functionality such as that described herein, including database modules, web interfaces, communications modules, and the like. For example, such subject information systems can be implemented by the providers of result information (e.g., test results), certification information (e.g., vocational certifications), training program information (e.g., completion of software programming courses), and the like.

Similarly, a client such as one of clients 260, can be used to make modifications, additions, deletions, changes, and other such alterations to the subject information maintained by server systems 255. For example, a client such a client 260(N) facilitates such customization through the provision of a number of modules providing such functionality. Thus, as depicted in FIG. 2B, client 260(N) includes a user interface module 290, a presentation module 292, an input module 294, an approval module 296, and a communications module 298, among other such possible components.

Client 260(N) provides user interface module 290 and presentation module 292 to allow a user to interact with the digital information that will be used to direct the ingestion (and, if needed, data cleansing) of subject information. User interface module 290 and presentation module 292 facilitate such interactions, for example, by supporting communications with database server 276, as well as subject information server 272, user information server 274, and communications server 280 in the maintenance of subject information, via network 265 and web server 278. In addition to facilitating such interactions, user interface module 290 and presentation module 292 also support the acquisition of information regarding, for example, user information, user credentials, change proposals, approval/denial of such change proposals, and the like. As will be appreciated in light of the present disclosure, client 260(N) thus includes input module 294, which provides a mechanism by which a user is able to provide such information and direction.

In a manner comparable to that of interactions between subject information systems 258 and certification server 270, clients 260 interact with database server 276 via network 265 (as well as web server 278, for example). In so doing, clients 260 are able to retrieve, update, request/make change proposals, provide approvals/denials, and perform other operations relevant to the digital information in question (the subject information) from one of more of server systems 255, as well as facilitate the requisite changes to that digital information and return the updated digital information to the appropriate servers (e.g., subject information server 272 and/or database server 276). Further in support of this process, user information server 274 can maintain digital information such as user information, user credentials, user preferences, account information, access rights, and the like, for use by one or more of the other server systems of server systems 255.

Aggregating and integrating the aforementioned digital information from, for example, certification server 270 and database server 276, among other sources, subject information server 272 provides support to users of subject information tracking system 250 in the validation, maintenance, and storage of the subject information in question. Further in support of this process, communication server 270 acts to make determinations with regard to which of clients 260 are permitted access to the subject information in question. The operation of the servers of server systems 255 are provided in connection with FIGS. 10-13, subsequently.

In view of the foregoing and as noted elsewhere herein, it will be appreciated that various ones of certification server 270, subject information server 272, user information server 274, database server 276, web server 278, and communications server 280, and/or other servers of server systems 255 (not shown), can be combined in various ways, as may be desired, and are simply shown as separate servers to simplify the description of such functions. Such is also the case for various ones of subject information systems 258 and/or clients 260, the functions of which can be combined in various ways to provide such functionalities in various clients.

Figure 3:
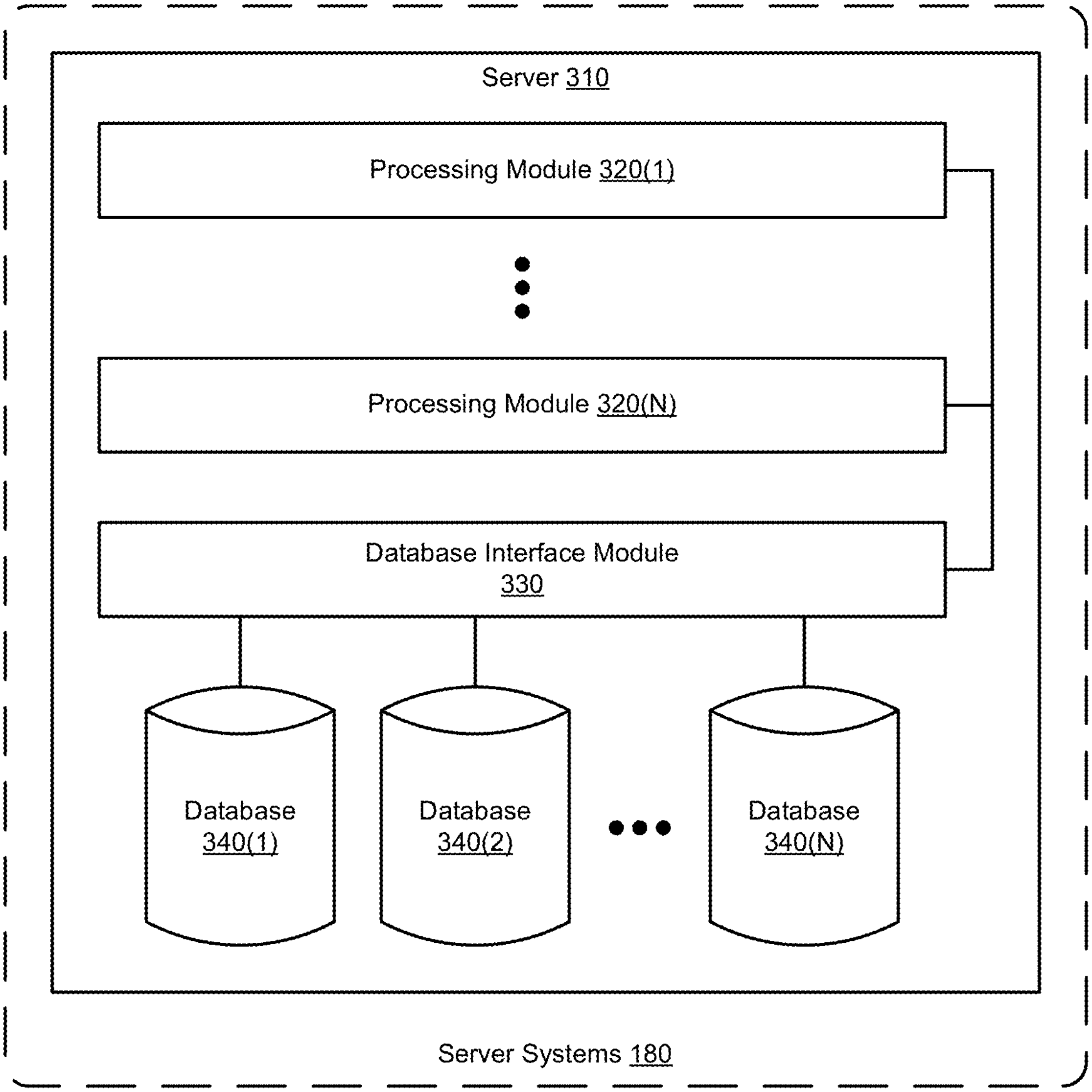
FIG. 3 is a block diagram illustrating an example of a generic server architecture, according to methods and systems such as those disclosed herein.

FIG. 3 is a block diagram illustrating an example of a generic server architecture, according to methods and systems such as those disclosed herein. FIG. 3 thus depicts a generic server architecture 300 that can be used to implement one or more of the server systems of server systems 180. A server of server systems 180 (depicted in FIG. 3 as a server 310) will thus include, typically, a number of components that support the maintenance and retrieval of digital information. For example, such components can include one or more processing modules (depicted in FIG. 3 as processing modules 320(1)-(N), a database interface module (depicted in FIG. 3 as a database interface module 330), and one or more databases (depicted in FIG. 3 as databases 340(1)-(N)). Generally, databases 340(1)-(N) store digital information pertinent to the processing performed by processing modules 320(1)-(N). Database interface module 330 provides one or more of processing modules 320(1)-(N) with access to databases 340(1)-(N). Additionally, database interface module 330 can provide other servers of the given server systems, as well as other components of the distributed manufacturing system, with access to databases 340(1)-(N). As noted, an example of such access is depicted in FIG. 2B by the various communications paths illustrated therein.

Figure 4:
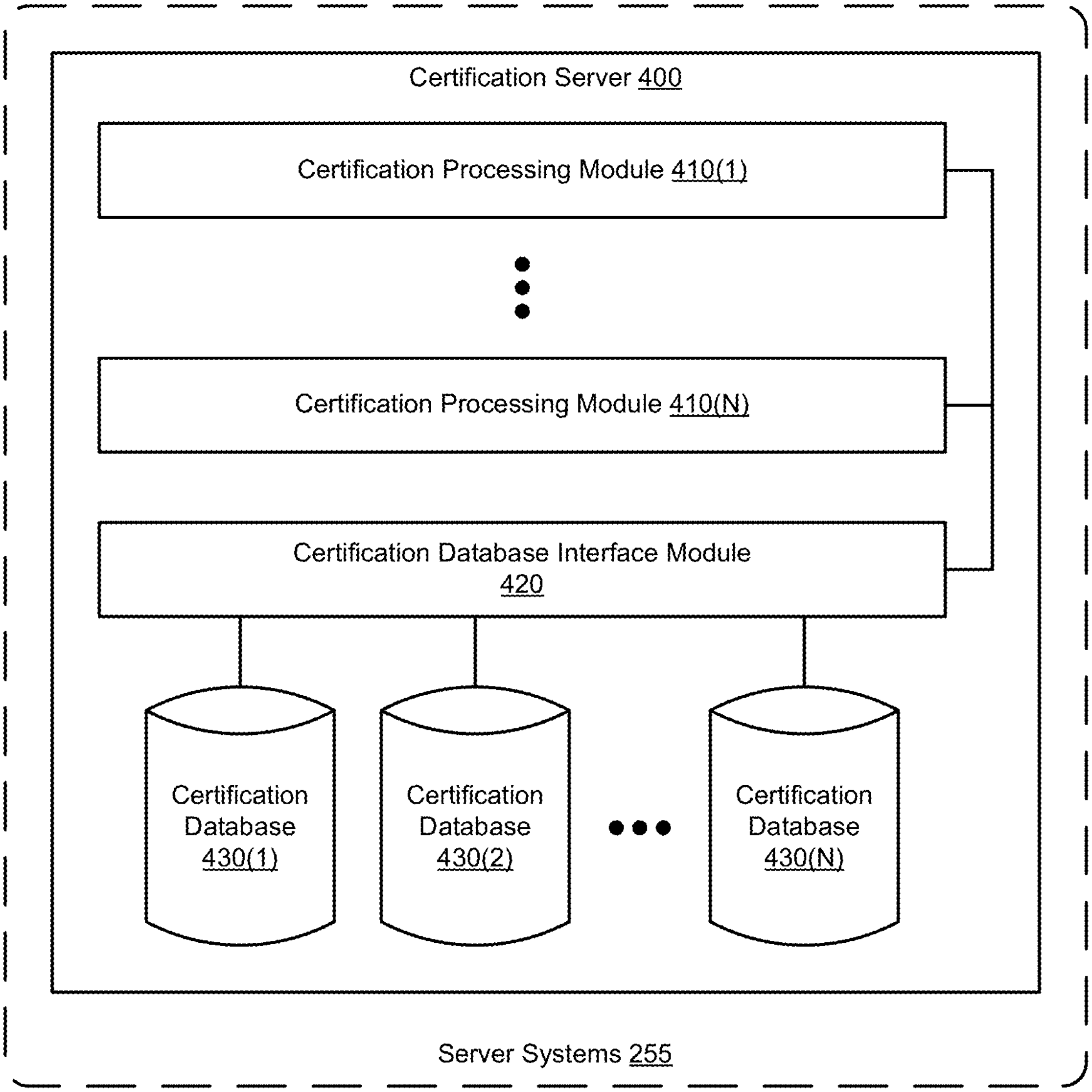
FIG. 4 is a block diagram illustrating an example of a certification server, according to methods and systems such as those disclosed herein.

FIG. 4 is a block diagram illustrating an example of a certification server, according to methods and systems such as those disclosed herein. In the manner of generic server architecture 300, a certification server of server systems 255 is depicted as a certification server 400. In the manner of generic server architecture 300, then, certification server 400 includes one or more certification processing modules (depicted in FIG. 4 as certification processing modules 410(1)-(N)), a number of certification databases (depicted in FIG. 4 as certification databases 430(1)-(N)), and interfacing such certification processing modules and certification databases, a certification database interface module (depicted in FIG. 4 as a certification database interface module 420). As noted in connection with FIG. 2, the components of certification server 400 support clients, such as clients 260 of FIG. 2B, by maintaining subject information, as may be maintained by subject information server 272 and database server 276 using such clients. To this end, certification database interface module 420 can provide other servers of server systems 255, as well as other components of the distributed manufacturing system, with access to certification databases, as well as information ingested from subject information systems 258 and subject data systems 259. For example, as depicted in FIG. 2, certification database interface module 420 can provide certification information to subject information server 272, database server 276, and web server 278 with access to certification databases 430 via one of the two communication paths depicted therein.

Figure 5:
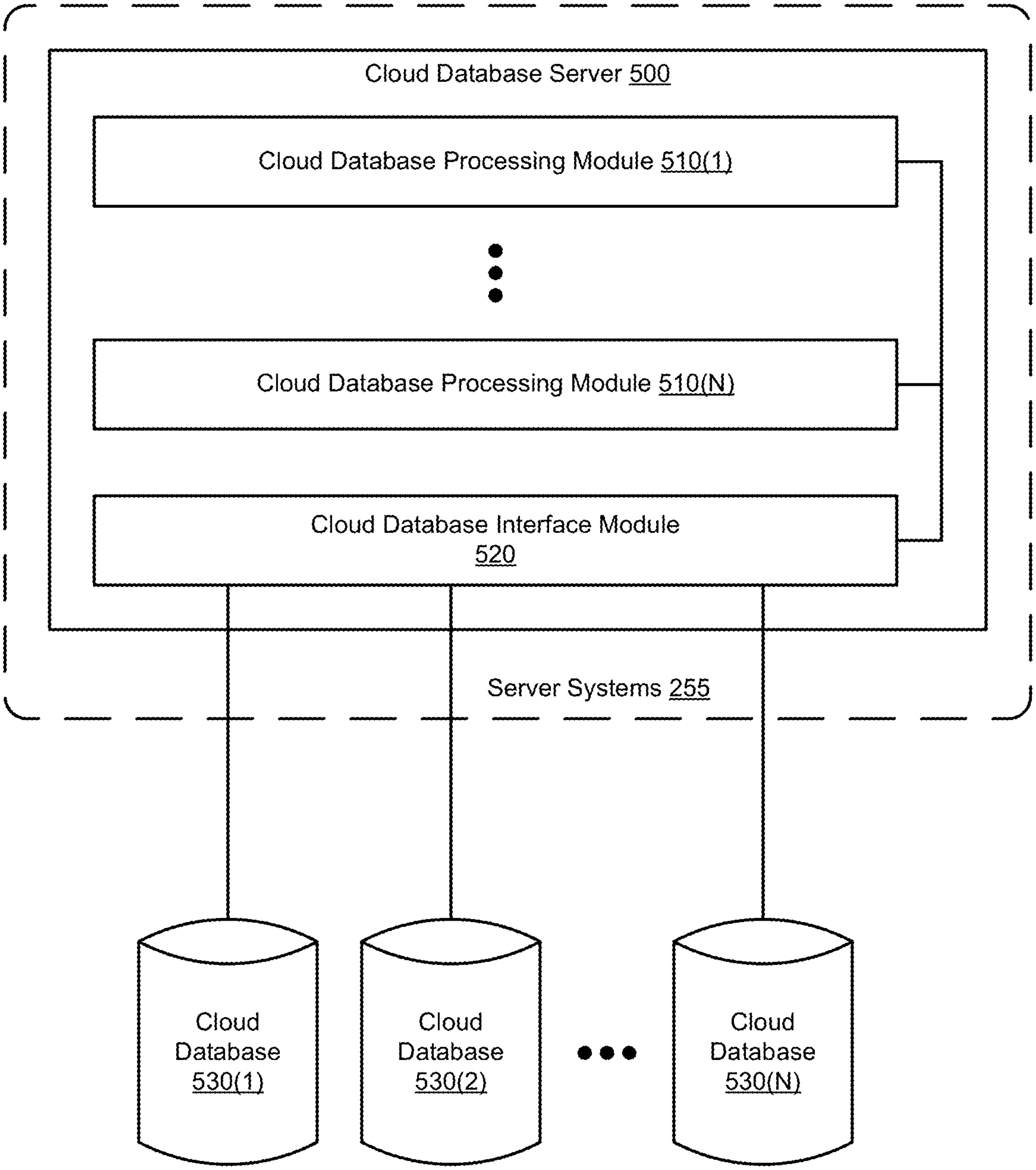
FIG. 5 is a block diagram illustrating an example of a cloud database server system, according to methods and systems such as those disclosed herein.

FIG. 5 is a block diagram illustrating an example of a cloud database server, according to methods and systems such as those disclosed herein. In the manner noted, server systems 255 can also include one or more cloud database servers, an example of which is depicted in FIG. 5 as a cloud database server 500. Cloud database server 500 includes one or more cloud database processing modules (depicted in FIG. 5 as cloud database processing modules 510(1)-(N)), which interface with one or more cloud database clients such as cloud database clients 230 of FIG. 2. Cloud database processing modules 510(1)-(N) can be implemented to support the implementation of one or more databases of database server 276, in the manner mentioned earlier, for example. Further, cloud database processing modules 510 (1)-(N) can support user-defined cloud databases and/or the like.

In turn, cloud database processing modules 510 interface via a cloud database interface module 520, with one or more cloud databases (depicted in FIG. 5 as cloud databases 530(1)-(N)). Cloud databases 530 maintain digital information regarding subjects (e.g., students) via one or more cloud database servers. In addition to cloud database processing modules 510 being able to communicate with one another, cloud database processing modules 510 are able to maintain digital information in one or more cloud databases 530 via cloud database interface module 520.

Additionally, cloud database interface module 520 can provide other servers of server systems 255, as well as other components of the subject information system, with access to cloud databases 530. For example, as depicted in FIG. 2, cloud database interface module 520 provides certification server 270, subject information server 272, and web server 278 with access to cloud databases 530 via one of the two communication paths depicted therein.

Information maintained by one or more servers such as subject information server 272 and database server 276 can include, for example, subject information for use by certification server 270 in maintaining and managing the subject information supported by subject tracking systems 250. Such databases can be implemented using, for example, a document-oriented databases, or document stores (a computer program designed for storing, retrieving and managing unstructured data such as document-oriented information (which can be referred to as, for example, semi-structured data) and other constructs that can be used to implement/represent the relevant communications). Such a database can be implemented as a type of "NoSQL" database (a "Not only SQL" database, where the term SQL refers to Structured Query Language), and which refers to the fact that such databases extend beyond the use of tabular information, as in a traditional relational database (RDB). Such a document-oriented database can be implemented, more specifically, as one or more databases that accept documents in JavaScript Object Notation (JSON; being a subclass of document-oriented databases that are optimized to work with JSON, a lightweight data-interchange format), extended markup language (XML; being a subclass of document-oriented databases that are optimized to work with XML documents) or graph databases (which are similar, but add another layer, the relationship, which allows them to link documents for rapid traversal). Such document-oriented databases are inherently a subclass of the key-value store, which is another NoSQL database concept. One difference is the manner in which the data is processed: in a key-value store, the data is considered to be inherently opaque to the database, whereas a document-oriented system relies on internal structure in the document in order to extract metadata that the database engine uses. Such a document database, for example, can store all information for a given object in a single instance in the database, and every stored object can be different from every other, thus eliminating the need for object-relational mapping while loading data into the database. In the present application, implementing such databases in the aforementioned manner facilitates the storage and maintenance of unstructured information used by subject information management systems such as those described herein (e.g., information in a variety of formats that can include subject information, testing information, certification information in a variety of formats (providing for the reporting of information in narrative formats, various image and document formats, and other types of information), and other such unstructured data, as is described in greater detail subsequently, and allowing for such information to be searched and identified quickly and efficiently).

With reference to the aforementioned communications with user clients 260, it will be appreciated, in light of the present disclosure, that a user interface presented by user interface module 290 and presentation module 292 can be generated, for example, by web server 278, in conjunction with its interactions with the servers of server systems 255, which can also include one or more distributed database (DDB) servers, as described subsequently. As will also be appreciated, in providing such "back-end" functionality, such servers access their respective in order to provide the requisite subject information for certification server 270, which provides such information to web server 278 to serve to user clients 260.

Figure 6:
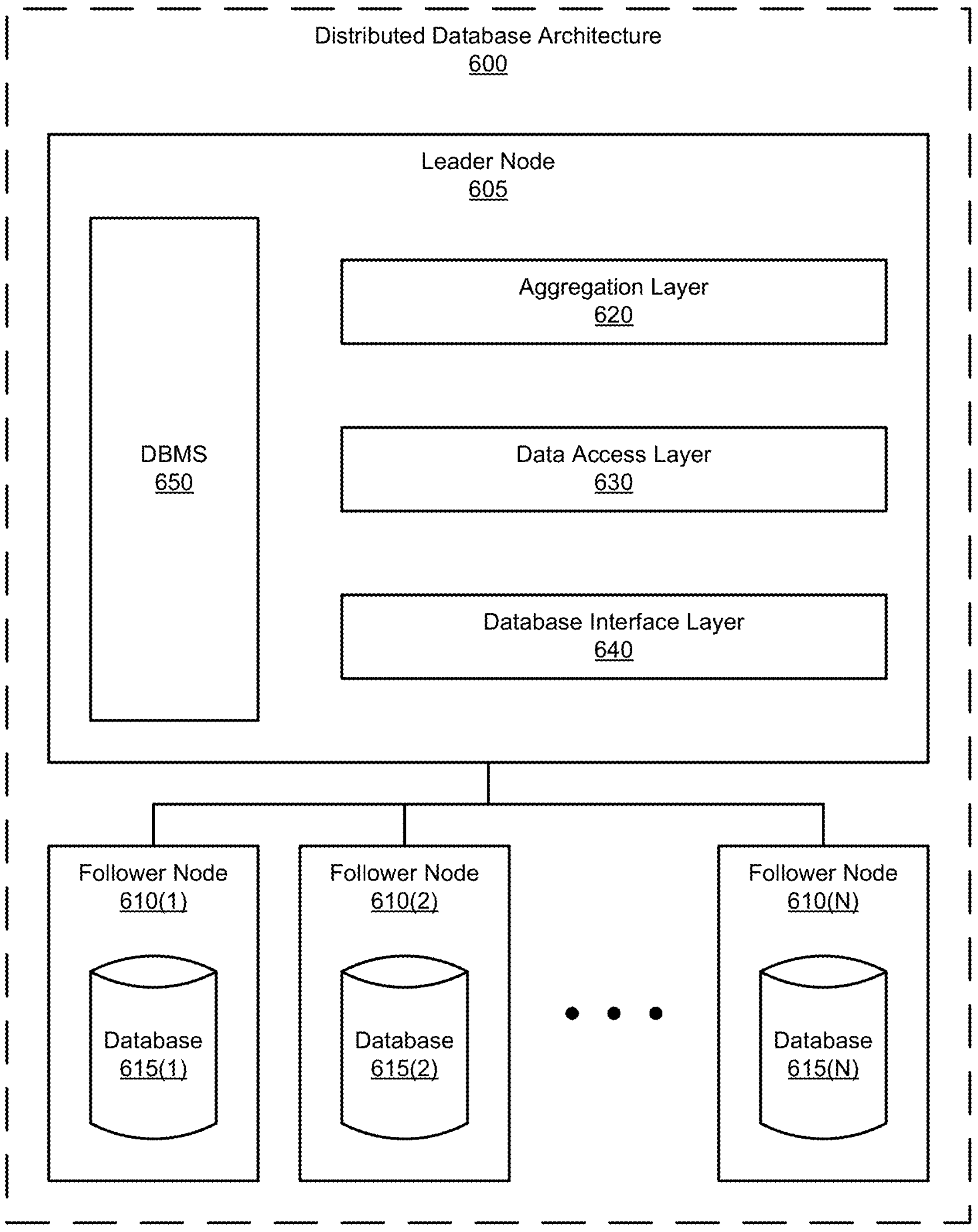
FIG. 6 is a block diagram illustrating an example of a distributed database server system, according to methods and systems such as those disclosed herein.

FIG. 6 is a block diagram illustrating an example of a distributed database architecture, according to methods and systems such as those disclosed herein. The database server architecture of FIG. 6 (depicted in FIG. 6 as a distributed database architecture 600) can include one or more leader nodes (e.g., depicted in FIG. 6 as a leader node 605) and some number of follower nodes (e.g., depicted in FIG. 6 as follower nodes 610(1)-(N), and referred to in the aggregate as follower nodes 610). Follower nodes 610, in turn, can include one or more databases (e.g., depicted in FIG. 6 as databases 615(1)-(N), and referred to in the aggregate as databases 615). As noted, a distributed database architecture such as distributed database architecture 600 can be used to store and maintain a variety of information useful to the management of subject activity completion, outcome information, and other such information, as is described in greater detail subsequently. As will be appreciated in light of the present disclosure, follower nodes 610 can, in fact, be situated at one or more remote sites (in certain architectures, colloquially referred to as being "in the cloud").

Returning to leader node 605, leader node 605 includes an aggregation layer 620, a data access layer 630, and a database interface layer 640. As is also depicted in FIG. 6, a database management system (DBMS) 650 can be implemented, for example, in leader node 605, and act to manage various of the components of distributed database architecture 600, thereby supporting the distributed nature of distributed database architecture 600. As will be appreciated in view of the present disclosure, a distributed database is a database in which storage devices are not all attached to a common processor. Such a distributed database may be stored in multiple computers, located in the same physical location; or may be dispersed over a network of interconnected computers. Unlike parallel systems, in which the processors are tightly coupled and constitute a single database system, a distributed database system consists of loosely coupled sites that share no physical components. System administrators can distribute collections of data (e.g. in a database) across multiple physical locations. A distributed database can reside on organized network servers or decentralized independent computers on the Internet, on corporate intranets or extranets, or on other organization networks. Because distributed databases store data across multiple computers, distributed databases can improve performance at end-user worksites by allowing transactions to be processed on many machines, instead of being limited to one.

An aggregation layer such as aggregation layer 620 facilitates the gathering and organization of information from various information sources appropriate to the information administered and maintained by server 605. For example, in certain embodiments, components within an aggregation layer of a distributed database server, as might be implemented to support a subject information server such as that described herein, receive and organize various information from one or more user clients such as user clients 260 and various of the systems of server systems 255. Components within an aggregation layer of a server such as a DDB server receive and organize information regarding various aspects of such systems, such as the various modes of communication noted. As will be appreciated in light of the present disclosure, such aggregation layers also provide, in turn, functionality that supports distribution of information such as that maintained in the databases or their respective servers.

Situated between aggregation layer 620 and database interface layer 640 is data access layer 630, which supports storage/retrieval of aggregated data to/from one or more databases. Data access layer 630 facilitates such storage/retrieval by using a common structure to sink and source such aggregated data. Data access layer 630 facilitates access to such databases (depicted in FIG. 6 as databases 615(1)-(N)) via database interface layer 640. Database interface layer 640 facilitates communication of aggregated data using the common structure to databases 615(1)-(N) in a structure appropriate to each of databases 615(1)-(N) and/or to databases 615, collectively. As noted, and with particular regard to the discussion of FIG. 2, an arrangement such as database server architecture 600 can be used in the implementation of servers such as subject information server 272 and/or database server 276. To this end, an aggregation layer such as aggregation layer 620 supports the collection of information from multiple sources (e.g., communications from/to subject information systems 258, subject data systems 259, and user clients 260), and provides such information for storage in a respective database, via a data access layer such as data access layer 630 (which produces aggregated data in a common structure for storage, and receives data in the common format when retrieving such data) and a database interface layer such as database interface layer 640 (which takes in the aggregated data in the common structure and produces data in a structure appropriate to the database into which the data is to be stored, and conversely, provides data in the common structure when retrieving such data). Such an architecture, in turn, supports the retrieval of such data.

Figure 7:
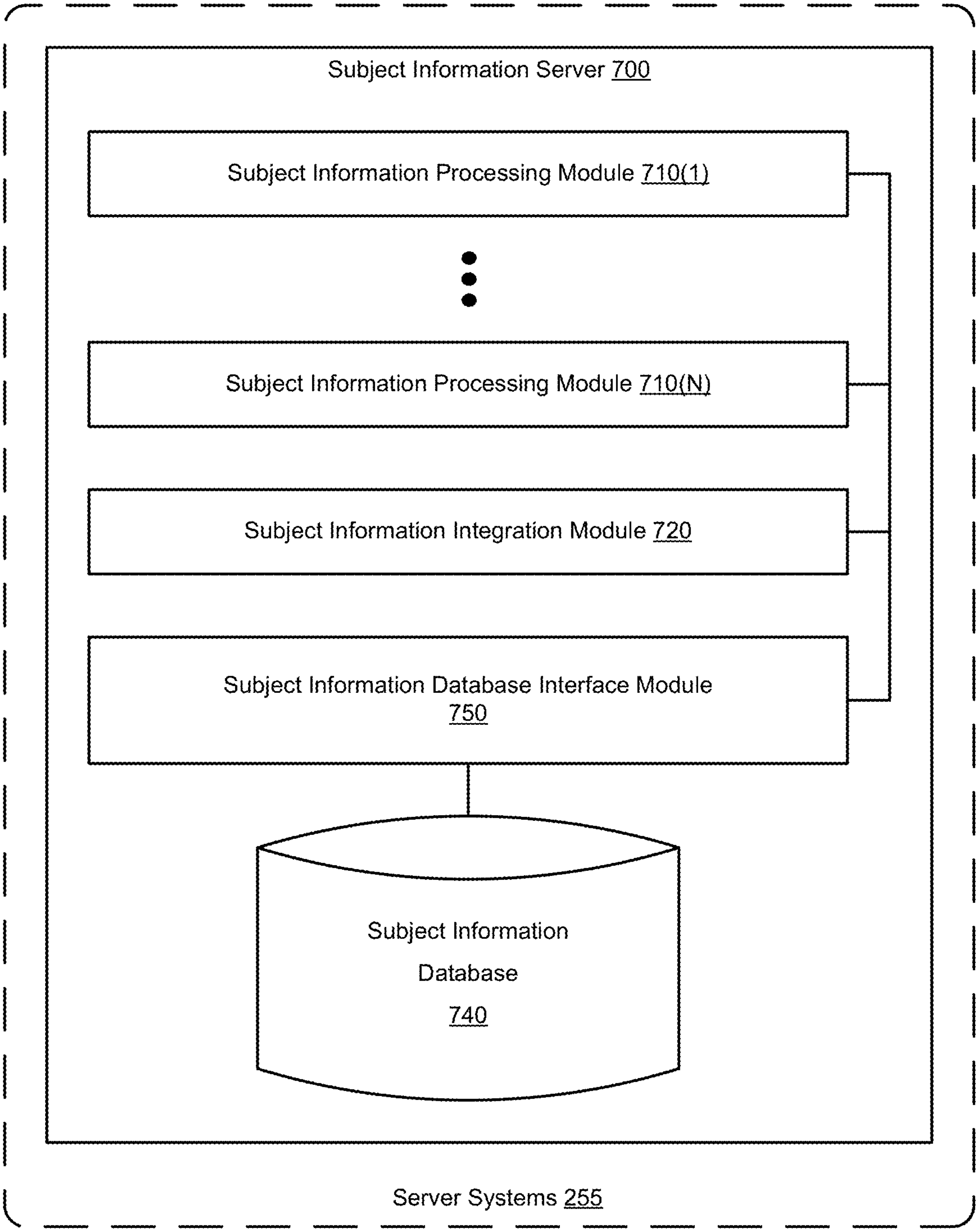
FIG. 7 is a block diagram illustrating an example of a subject information server, according to methods and systems such as those disclosed herein.

FIG. 7 is a block diagram illustrating an example of a subject information server, according to methods and systems such as those disclosed herein. Another server included in server systems 255 is a subject information server (depicted in FIG. 7 as a subject information server 700). Subject information server 700 can include a number of components, among them, for example, one or more media information processing modules (depicted in FIG. 7, as subject information processing modules 710(1)-(N)), one or more subject information integration modules (depicted in FIG. 7 as a subject information integration modules 720), and one or more subject information databases (depicted in FIG. 7 as a subject information database 740), accessed via a subject information database interface module (depicted in FIG. 7 as a subject information database interface module 750).

To this end, subject information database interface module 750 can provide other servers of server systems 255, as well as other components of the subject tracking systems, with access to subject information database 740. For example, in the manner of subject information server 272 depicted in FIG. 2, subject information database interface module 750 provides certain servers of the server systems (e.g., certification server 270, database server 276, and web server 278 of FIG. 2) with access to subject information database 740 via one of the two communication paths depicted therein, as well as access thereto to other servers of server systems 255 (e.g., user information server 274, web server 278, and communications server 280 of FIG. 2) via the other of the two communication paths depicted therein.

As will be appreciated in light of the present disclosure, then, digital subject information and digital certification information can be maintained separately by way of their respective servers, and subsequently integrated by a subject information server such as subject information server 700. In such embodiments, subject information processing modules such as subject information processing modules 710 can aggregate the requisite digital information from the appropriate sources (e.g., a certification server such as certification server 400 and a database server such as cloud database server 500), and integrate such digital information thus retrieved by way of an information integration module such as subject information integration module 720. Having assembled the requisite digital information, subject information server 700 can (e.g., through communications between subject information integration module 720, subject information database 740, and subject information database interface module 750) facilitate communication of such digital information to a communications server such as communications server 280 of FIG. 2, for subsequent distribution to the appropriate destination(s).

Figure 8:
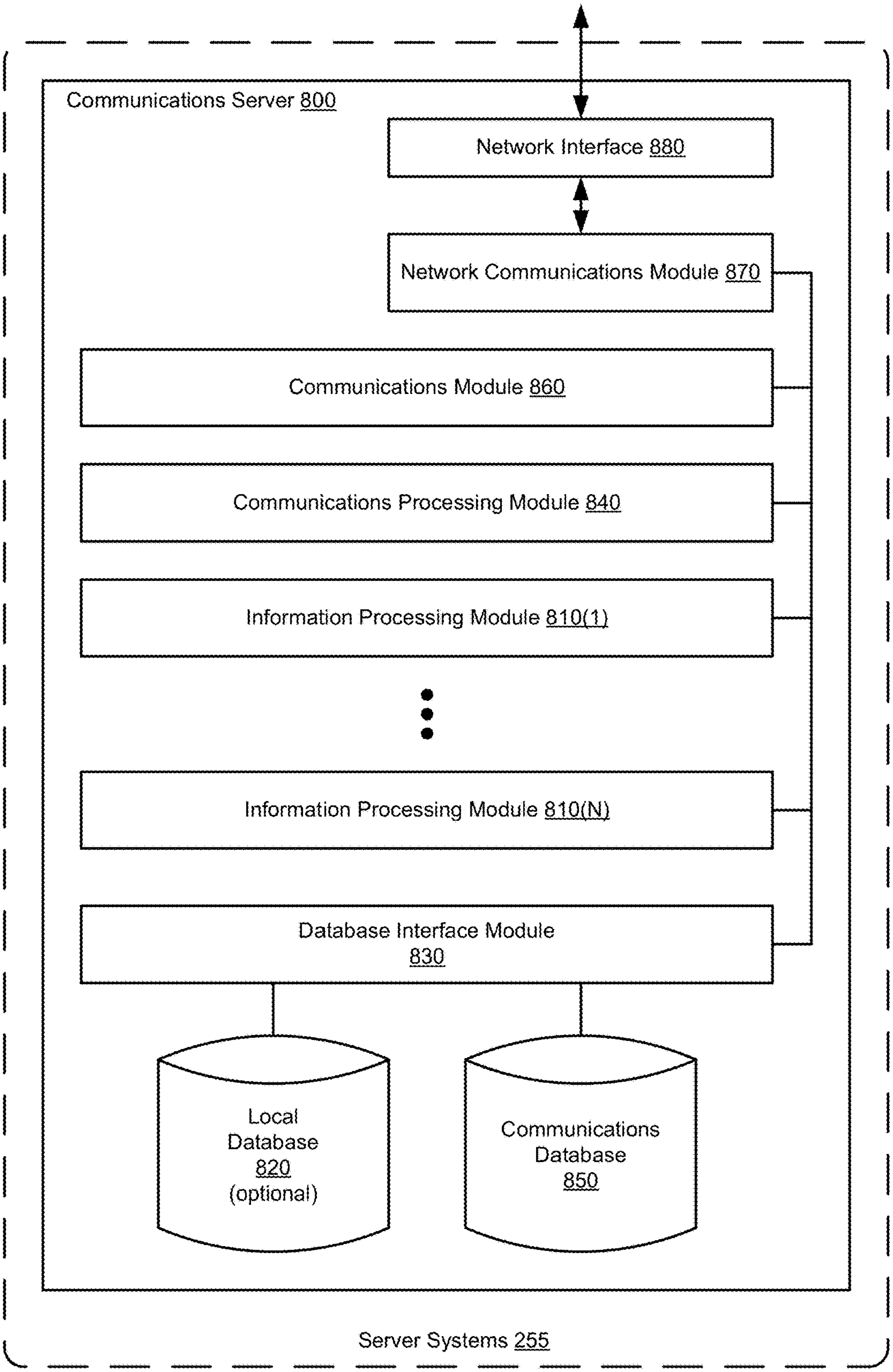
FIG. 8 is a block diagram illustrating an example of a communication server, according to methods and systems such as those disclosed herein.

FIG. 8 is a block diagram illustrating an example of a communication server, according to methods and systems such as those disclosed herein. In certain embodiments, server systems 255 will include for such purposes one or more communications servers, such as a communications server 800. Communications server 800 includes a number of components that support communication with subject information sources (e.g., subject information systems 258 and/or subject data systems 259) and the provision of the requisite digital information to the others of server systems 255.

In one embodiment, communication server 800 includes one or more information processing modules (depicted in FIG. 8 as information processing modules 810(1)-(N)). Information processing modules 810, in certain embodiments, contain the requisite digital information from one or more servers (e.g., subject information server 700 of FIG. 7). In those or other embodiments, each of information processing modules 810 can be configured to process subject information for one or more corresponding subjects (e.g., students). Information processing modules 810 can, optionally, maintain such digital information in a local database (depicted in FIG. 8 as a local database 820) by communicating therewith via a database interface module 830. In turn (or in parallel), one or more determinations can be made as to the appropriate entities to which such digital information is to be sent. To this end, such digital information can be integrated into existing subject information that is then stored in a subject information database.

In support of such operations, production database interface module 830 can provide other servers of server systems 255, as well as other components of the subject tracking systems, with access to subject information and certification information. For example, as depicted in FIG. 2B, production database interface module 830 provides subject information server 272, user information server 274, and web server 278 with access to local database 820 via the other of the two communication paths depicted therein (or both, in certain embodiments).

Operations such as those described generally above can be carried out by a communications processing module of communications server 800 (such as is depicted in FIG. 8 as a communications processing module 840). In performing such operations and making such determinations, communications processing module 840 can interface, via database interface module 830, with a communications database (depicted in FIG. 8 as a communications database 850), and in so doing maintain information regarding the topology of a network such as is illustrated as subject tracking systems 250 in FIG. 2. Once the digital information in question is available and the destination(s) therefor have been identified, such digital information can be communicated thereto under the control of a communications module (depicted in FIG. 8 as a communications module 860). Communications module 860 can, for example, retrieve the requisite digital information from local database 820 and the destination(s) selected from communications database 850, via database interface module 830. Communications module 860 then controls the communication of this digital information to the selected destination(s) via a network communications module (depicted in FIG. 8 as a network communications module 870) and a network interface (depicted in FIG. 8 as a network interface 880). In certain embodiments, each of information processing modules 810 can be configured to process subject information for certain populations of subjects, for example. As noted earlier, local database 820 can, optionally, maintain digital information with regard to completed change proposal approval/denial, and so (digitally) maintain the information needed to track a given subject.

Figure 9:
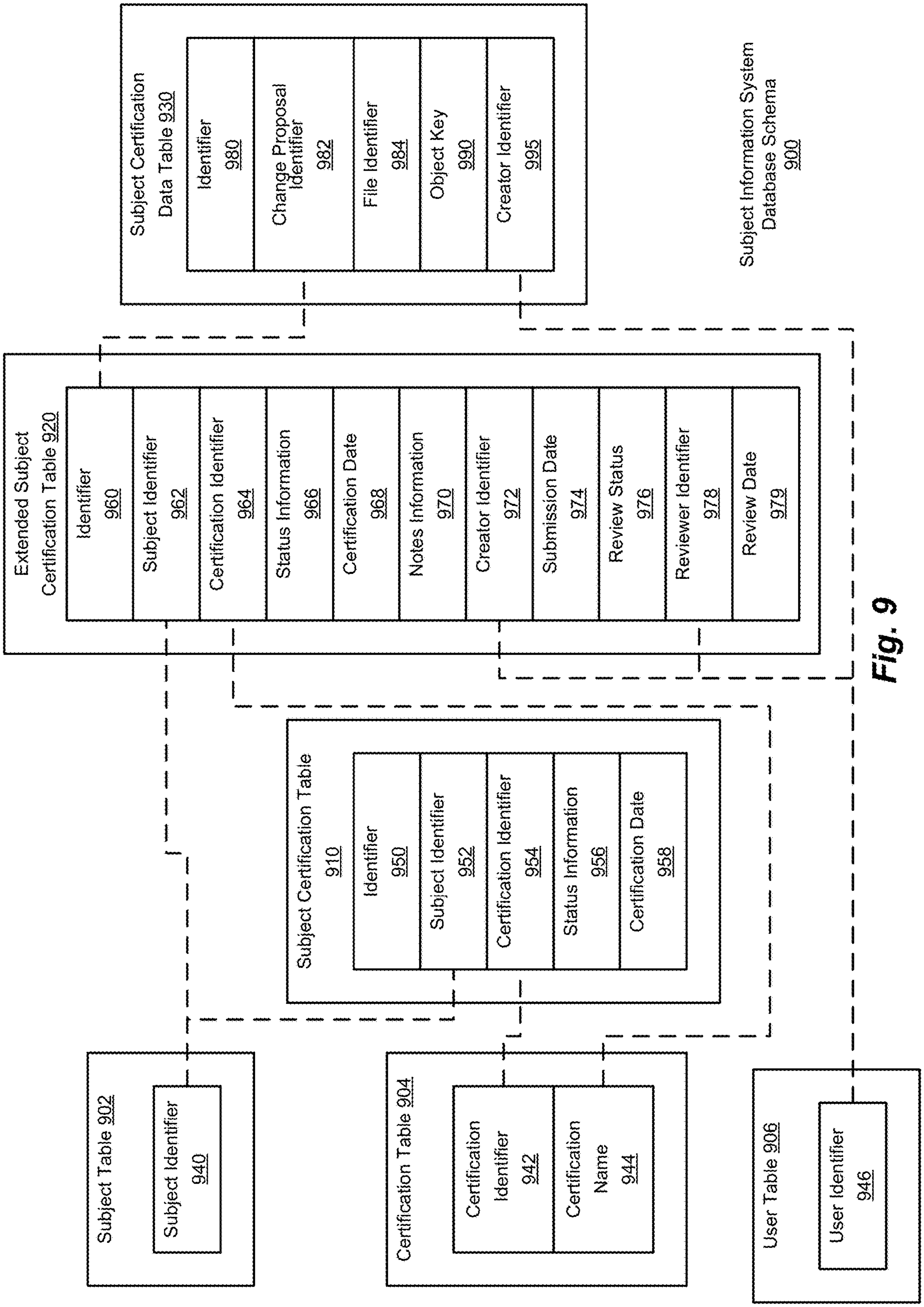
FIG. 9 is a block diagram illustrating an example of a certification management database schema, according to methods and systems such as those disclosed herein.

FIG. 9 is a block diagram illustrating an example of a certification management database schema, according to methods and systems such as those disclosed herein. FIG. 9 thus depicts a subject information management system database schema 900 (also referred to herein as a certification management system database schema). Subject information management system (SMS) database schema 900 is depicted, in pertinent part, as including a number of tables. These tables include, in the example, depicted in FIG. 9, a subject table 902, a certification table 904, a user table 906, a subject certification table 910, and extended subject certification table 920, and a subject certification data table 930. In turn, subject table 902 includes information regarding one or more subjects, an example of which is a subject identifier 940. Similarly, certification table 904 includes a certification identifier 942, which identifies the certification being accorded (or worked on by) the subject, and information regarding the certification, such as a certification name 944. User table 906, which includes information regarding the users of the systems supported by subject information system database schema 900 (e.g., the names of users, user credentials for the system, and similar information), is depicted as including a user identifier 946, which, among other is, allows for the tracking of interactions for purposes of audit trail generation.

In certain embodiments, two user roles are used in the change proposal process: contributor and reviewer. Reviewers can be contributors but contributors are not necessarily reviewers. When a contributor creates a change proposal, not only is the proposal itself noted, but also additional data. In so doing, an audit trail can be generated from such information, in the event that any entity needs to investigate the history of how a student record came to be in its present condition. Such data can include:

Which user proposed the change proposal?
When did they propose the change?
What notes did they include in the change proposal?
What files did they attach as evidence to back the proposal for changing a student's record?

When a reviewer approves or rejects a change proposal, information such as the following is recorded:

Which user approved or rejected the change proposal?
Did they approve or reject the change proposal?
When did they approve or reject the change proposal?

This allows the system to present the history of data in a number of ways:

If a user wants to look at the change proposals for why a specific student obtained a particular industry-based certification, the change proposals can be filtered by student and certification and see all the change proposals with their statuses to see who proposed what and when and who approved or rejected this change proposal.

If a user wants to see what change proposals are still waiting for a review, the change proposals can be filtered based on an unreviewed status for change proposals.

If a user wants to see what change proposals were made by an individual, the change proposals can be filtered based on the creator of change proposals for a specific user.

If a user wants to see what change proposals were accepted by an individual, the change proposals can be filtered based on the reviewer and an approved status.

This captured information allows for checks and balances to ensure that the data entered can be trusted more than a spreadsheet where anyone with access can edit it. However if any data seems to be incorrect, one can investigate to see why it is that way.

This system can provide support for the following real world scenarios. For example, in the context of high school students obtaining certifications:

A counselor selects the NCCER Carpentry, Level 2 certification instead of the NCCER Carpentry, Level 1 certification in their change proposal. The reviewer can see the change proposal, see the attached scan of the NCCER Carpentry, Level 1 certification, see which counselor misidentified the certification for the student record, and reach out to the individual to correct the change proposal.

A principal does a course audit of student records and finds that an associate principal has been approving student record change proposals with insufficient evidence. They will be able to see who accepted the change proposals and correct the process.

A state department of education (e.g., in Texas, Texas Education Agency (TEA), but in fact, any external party) decides to perform an audit on a school district because it got flagged for having way more students obtaining industry-based certifications than in previous years. The school district can defend their claim by presenting all the certificates that have been attached to the records of students that have obtained industry-based certifications.

A rural school district counselor archives all student activity by memory. This counselor then leaves for another school district. Centralizing a shared system of record allows the counselor to leave without taking the knowledge of which students did what with them.

Subject certification table 910 includes an identifier 950 (which allows subject certification records to be identified). Subject certification table 910 also includes a subject identifier 952, a certification identifier 954, status information 956, and a certification date line 58, for example. As can be seen, subject certification table 910 not only includes records identified by identifier 950, but also is keyed to a particular subject's subject identifier (correspondence between subject identifier 940 and subject identifier 952). Similarly, a subject's certification(s) can be identified by a correspondence between certification identifier 942, certification table 904, and certification identifier 954. Such correspondences demonstrate relationships between the information in subject table 902 and that in subject certification table 910, and between information in certification table 904 and that in subject certification table 910. Status information in status information 956 can include information that likes a subject's progress in applying, obtaining, and/a given us of certification. In this vein, certification date 958 contains information reflecting the last date status was obtained and the date on which certification was received.

Extended subject certification table 920 is a database table that is comparable to subject certification table 910, but which contains additional information that supports audit trail functionality, record searching functionality, and the like. Extended subject certification table 920, in turn, can include, for example, a record identifier (e.g., identifier 960), a subject identifier 962, a certification identifier 964, status information 966, and a certification date 968. Additionally, extended subject certification table 920 includes additional information supporting functionalities such as those just noted. To this end, extended subject certification table 920 includes notes information 970, a creator identifier 972, a submission date 974, a review status 976, a reviewer identifier 978, and a review date 979.

As before, in connection with subject certification table 910, extended subject certification table 920 includes records identified by identifier 960, and is keyed to a particular subject's subject identifier (correspondence between subject identifier 940 and subject identifier 962). Similarly, a subject's certification(s) can be identified by a correspondence between certification identifier 942, certification table 904, and certification identifier 964. Such correspondences demonstrate relationships between the information in subject table 902 and that in extended subject certification table 920, and between information in certification table 904 and that in extended subject certification table 920. As before, status information in status information 966 can include information that likes a subject's progress in applying, obtaining, and/a given us of certification. Also as before, certification date 968 contains information reflecting the last date status was obtained and the date on which certification was received.

As noted, extended subject certification table 920 can include a number of additional fields. Such additional fields can provide for the maintenance of information in the form of notes (e.g., maintained in notes information 970). Additionally, information regarding the user creating a change proposal (e.g., as reflected by creator identifier 972), and the date and time of such a submission (e.g., maintained as submission date 974), are maintained in extended subject certification table 920. Extended subject certification table 920 can also be used to maintain information regarding the change proposal review process (e.g., for audit trail purposes). Such information can include a reviewer identifier for the given change proposal (e.g., as might be maintained as reviewer identifier 978) and the date on which the change proposal was reviewed (e.g., as might be maintained as review date 979). As can be seen, a user identifier for the user submitting a change proposal can be used to track such change proposals (e.g., as by the correspondence between a user identifier such as user identifier 946 and a creator identifier such as creator identifier 972). Similarly, a user identifier for the user reviewing and approving/denying change proposals can be used to track such and approval/denial (e.g., as by the correspondence between a user identifier such as user identifier 946 and a reviewer identifier such as reviewer identifier 972).

In order to substantiate the basis for a change proposal (a request by a change proposal creator on behalf of a given subject), a user creating a change proposal can provide (digitized) information for review by the reviewer by way of adding such digital information to, for example, a database such as a cloud database and/or a distributed database, in the manner of those described earlier herein. To that end, subject certification dated table 930 provides for the storage, maintenance, retrieval, tracking, and other management functionality, of such information. As depicted in FIG. 9, subject certification dated table 930 includes an identifier 980, a change proposal identifier 982, a file identifier 984 and object key 990, and a creator identifier 995, among other such possible pieces of information regarding substantiating data to the subject's certification or other qualification. As before, identifier 980 maintains information that provides for the identification of records having subject certification data associated therewith. In a manner comparable to that described earlier with regard to other fields, change proposal identifier 982 allows a record in extended subject certification table 920 to be keyed corresponding record in subject certification dated table 930 by identifier 960, and so associated with the appropriate subject and users. File identifier 984 maintains information identifying the data (e.g., a file data structure) substantiating the basis for the subject's certification (or other qualification). In certain embodiments, subject certification data table 930 may reference one or more objects stored in an appropriate data store. In such scenarios, and object key such as object key 990 can be used to identify such objects. Such an object key is also referred to herein as a token. Such a token (which can be generated, in certain embodiments, using a hash function, for example) can be used to provide a fast, efficient method for accessing such objects. In the manner noted earlier, creator identifier 995 allows for a correspondence between the users whose information is stored in user table 906 and the subject certification data submitted by those users (e.g., the correspondence between a user identifier such as user identifier 946 and a creator identifier such as creator identifier 995 can be used both for audit trail purposes, as well as to allow of subject certification data by user identifier, and vice versa).

Figure 10:
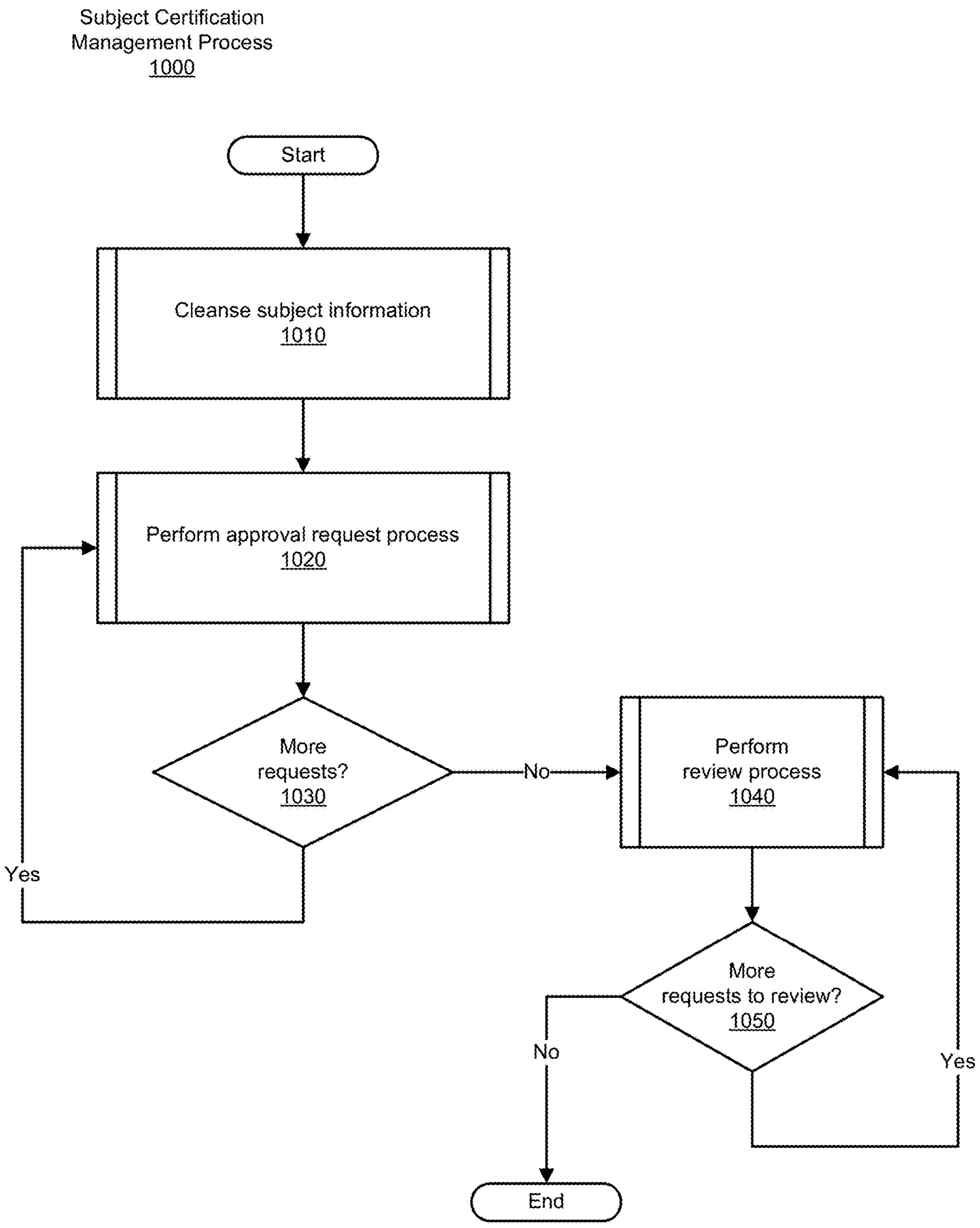
FIG. 10 is a simplified flow diagram illustrating an example of a subject certification management process, according to methods and systems such as those disclosed herein.

FIG. 10 is a simplified flow diagram illustrating an example of a subject certification management process, according to methods and systems such as those disclosed herein. The subject certification management process (a subject certification management process 1000) begins with the cleansing of subject information (1010), which is a data cleansing operation. A more detailed discussion of such a subject certification management process is provided in connection with the example process presented in FIG. 11, subsequently. Once the subject information in question is known to be good with a sufficient level of confidence, an approval request process can be performed (1020). A more detailed discussion of such a change approval request process is provided in connection with the example process presented in FIG. 12, subsequently. A determination is then made as to whether any further requests remain to be processed (1030). Should further change approval requests remain to be processed, subject certification management process 1000 loops to processing the next change approval request. As will be appreciated in light of the present disclosure, the iterative process depicted in this part of subject certification management process 1000 is merely illustrative, and meant only to capture concepts related to the user such as a request creator generating one or more change approval requests. In practice, a number of such change approval requests will be created substantially simultaneously (although such requests can be created serially, in the manner shown (e.g., as by a single user)).

Alternatively, if no further change approval requests remain to be processed, subject certification management process 1000 proceeds to performing an approval review processing operation (1040). A more detailed discussion of such a review process is provided in connection with the example process presented in FIG. 13, subsequently. As before, a determination is then made as to whether further change approval requests remain to be reviewed (1050). If further change approval requests remain to be reviewed, subject certification management process 1000 loops to performing the review process for the next change approval request. Alternatively, subject certification management process 1000 concludes. As also noted before, the iterative process depicted in this part of subject certification management process 1000 is merely illustrative, and meant only to capture concepts related to the user such as a reviewer reviewing one or more change approval requests. In practice, a number of such change approval requests will be reviewed substantially simultaneously (although such requests can be reviewed serially, in the manner shown (e.g., as by a single user)).

Figure 11:
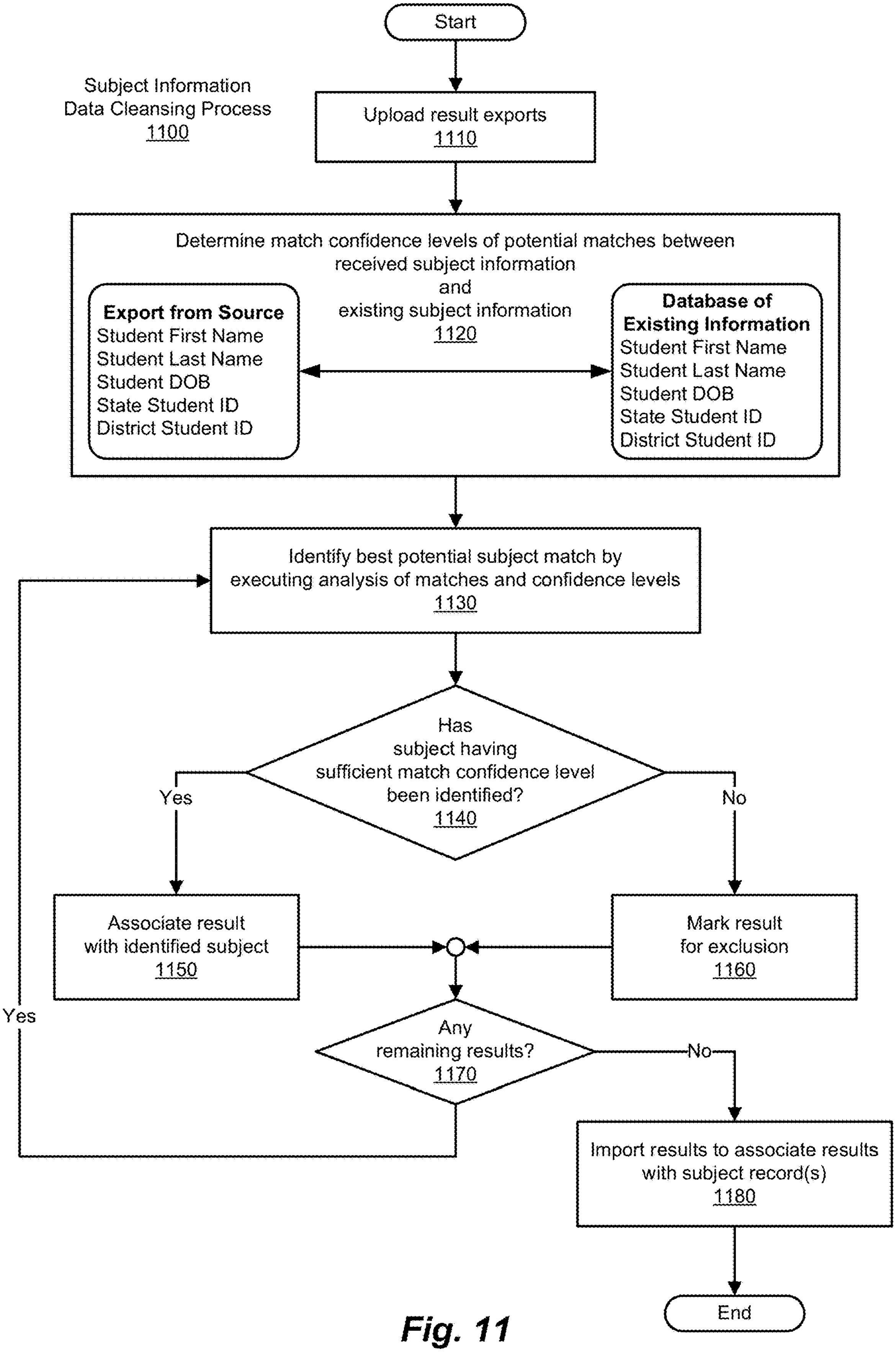
FIG. 11 is a simplified flow diagram illustrating an example of a subject information data cleansing process, according to methods and systems such as those disclosed herein.

FIG. 11 is a simplified flow diagram illustrating an example of a subject information data cleansing process, according to methods and systems such as those disclosed herein. FIG. 11 thus depicts the subject information data cleansing process 1100. Subject information data cleansing process 1100 begins with the receipt of course data, which, in certain embodiments, can include the uploading of result exports from subject information systems (1110). Raw data, in the present example, comprehends data that may include typographical errors, missing or incorrect values, and/or other such errors.

The aforementioned exporting and uploading can be accomplished, for example, in the following manner.

1. In certain embodiments, the given subject information system (e.g., a student information system) exports subject information that, in certain embodiments, includes some or all of the following information:
    a. First Name
    b. Last Name
    c. Date of birth (DOB)
    d. State Unique Identifier
    e. District Student Identifier
    f. Additional fields as may be useful for result matching, including captured information such as demographic data (e.g., race/ethnicity), gender, special education status, economic disadvantage status, and so on (at the least, such information contributes to the dashboard view of a subject)
2. Upload the exported data to the system (subject data ingestion)

With regard to importing (uploading) data from the subject information system in question, the potential fields listed above are those of interest, and the format thereof can employ standard types (numerical (integer, real), alphanumeric, date, etc.). Alternatively, or in combination therewith this, non-standard data types can be employed (e.g., data structures that are specific to the information being transferred (e.g., medical diagnosis (diagnoses) follow DSM-5, and use a specific representation of each possible diagnosis, but are limited to a subset of possible diagnoses)). In certain embodiments, the subject information is represented by strings and integers, but can be coded in a manner to maintain compatibility with existing systems. For example, in certain embodiments, an economic disadvantage code can be made to match existing codes currently in use. Another example are codes used for special education (SpEd) that may be divided out, or treated as a single general code.

More generally, this process is referred to as data cleansing, and may involve not only the removal of typographical errors and validating/correcting values against a known list of entities, but also provide data enhancement (where data is made more complete by adding related information) and harmonization/normalization of data. In the present context, the validation performed is typically fuzzy or approximate string matching (such as correcting records that partially match existing, known records), but can employ strict matching, depending on the application.

Next, uploaded subject information is matched with existing subject information to determine the viability of the subject information in question (1120). In certain embodiments, such matching is accomplished by way of a subject matching process such as that now described. In such an embodiment, the system(s) match identifying information regarding subjects from test results to identifying information regarding subjects in the appropriate database(s), based on a comparison of attribute values (e.g., pieces of identifying information of each for each subject), as between the two. Various analyses can be performed to cleanse the raw subject information received, either individually or in combination. Examples include approximate (fuzzy) string matching, one or more machine learning analysis operations, and/or a straight (go/no go) comparison. Such analyses can also be used in combination, by way of aggregating their results (e.g., for a given subject, summing the results of the analyses employed, with each being either by a certain amount, possibly as to the result provided) or sequentially (e.g., with a simpler analysis (straight comparison) performed first and increasingly complex analyses performed subsequently if the initial analysis fails to meet the desired matching confidence level (e.g., if an acceptable match is not found by straight comparison, perform fuzzy matching, and if a match is still not found, perform a machine learning analysis operation).

In one embodiment, five pieces of personally identifiable information of subjects are considered, which are, in certain embodiments:

First Name
Last Name
DOB
District Identifier
State Identifier

In the context of students, such as high school students, grade level or graduation year can also be considered. That said, inventors have found that matching results produced using these five pieces of information have provided sufficient performance and accuracy in finding good matches in the context of grade school students. These values are also common to both what an entity like College Board includes in a data export and what is available the system's database.

In such an embodiment, a match percentage between the test result's subject (each line of the data export) and subjects having identifying information already in the system can be determined. In such an embodiment, each component is scored (from 0.0 to 1.0) according to how similar the strings in the data export are with subject data in the system. To this end, a trigram similarity can be employed to calculate each component's match score though other methods (e.g., a ratio, a partial ratio, or Levenshtein distance, or other such string metrics) can be used to good effect. For example, a trigram (a group of three consecutive characters taken from a string) can be considered. The similarity of two strings can be measured by counting the number of trigrams they share. This approach is an effective approach for measuring the similarity of words, and is capable of providing such functionality in a variety of natural languages. Such approaches can be referred to as fuzzy matching, which allows matching information to be identified based on something less than an identical match between two pieces of information. In the present application, given that information ingested by a system such as that described herein often contains misspellings, omissions, and other flaws that make an exact match unlikely (and certainly, impossible to guarantee).

In the present context, the Levenshtein distance is used as a string metric for measuring the difference between two sequences. Informally, the Levenshtein distance between two words is the minimum number of single-character edits (insertions, deletions or substitutions) required to change one word into the other. Levenshtein distance may also be referred to as edit distance, although that term may also denote a larger family of distance metrics known collectively as edit distance.

Thus, in one embodiment, a Levenshtein distance between two strings a, b (of length |a| and |b|, respectively) is given by lev(a, b), where:

$$lev(a,b)=\begin{cases}|a| & \text{if } |b|=0,\\ |b| & \text{if } |a|=0,\\ lev(\text{tail}(a),\text{tail}(b)) & \text{if } a[0]=b[0]\\ 1+\min\begin{cases}lev(\text{tail}(a),b)\\ lev(a,\text{tail}(b))\\ lev(\text{tail}(a),\text{tail}(b))\end{cases} & \text{otherwise}\end{cases}.$$

where the X of a given string x is a string of all but the first character of x, and x[n] is the nth character of the string x, starting with character 0. It will be appreciated that the first element in the minimum corresponds to deletion (from a to b), the second to insertion, and the third to replacement, which implementation corresponds to a naïve recursive implementation. Thus, in such approximate string matching, the objective is to find matches for short strings in many longer fields, in situations where a small number of differences is to be expected, as is the case in which subject information is being cleansed. Further, given that subject information may be entered by data entry personnel, the use of a Damerau-Levenshtein distance technique (which further accounts for transpositions) may be used to good effect in systems such as those described herein. For example, in the case of grade reports for student, certain education management systems employ data entry personnel to enter a students' information (e.g., course identifiers, course descriptions, the student's grades for the given course, and other such information). In such systems, the use of a Damerau-Levenshtein distance technique provides additional resilience to the type of errors such hand entry can cause.

Natural language processing (NLP) can also be used to good effect in such scenarios. For example, in certain embodiments, a two-phase approach can be employed. In one example of such an embodiment, a data preprocessor can be employed to perform preprocessing operations on the information received from various of the subject information sources described herein, which can then store this preprocessed data as prepared data. Natural language processing can then be performed on such data by a natural language processor. Such a natural language processor can employ one or more of a number of natural language processing techniques to process the prepared data into a better form for use as one or more inputs to, for example, string matching processing (e.g., the trigram processing described), In so doing, such processing can identify, for example, information erroneously entered in an incorrect field (e.g., identifying an address field mistakenly entered into a name field, a zip code entered in a subject identifier field, or other such errors). Such natural language processing techniques can include, for example, keyword extraction, relationship extraction (e.g., the extraction of semantic relationships between words and/or phrases from the prepared data), part-of-speech tagging, concept tagging, summarization, and sentiment analysis classification, among other such techniques applicable to information received as subject information and preprocessed by the data preprocessor. Thus, the preprocessing of subject information need not employ a predefined list of keywords. Rather, keywords and other information can be extracted dynamically from the subject information received. For example, natural language processing can be applied in order to remove extraneous words and/or numbers, remove words that do not add value to a subject's description, remove common words that are not indicative of the information of interest, replacing common abbreviations with standard, and other such operations that may improve the accuracy of the match processing subsequently performed. The text that remains can be treated as the desired subject information. Further in this regard, keyword weighting can be employed (based either on historical experience or expected importance of given keywords), in order to further improve the efficacy of the subsequent match processing. Further, such processing can be performed iteratively to reach an acceptable level of accuracy and conciseness of the resulting subject information.

Depending on the information ingested by the system, such processing may have to process unstructured data (e.g., text files, spreadsheets (such as those mentioned with regard to potential existing subject data), web pages, slide presentations, and other types of unstructured data, including collections thereof (e.g., the storage of such objects in a filesystem, for example)). One example of such an analysis process is a term frequency-inverse document frequency analysis. Thus, for example, a term analysis process that identifies terms of interest in an item can use a combination of the frequency of use of the term in the item, and the frequency of use of the term in items of a corpus, and can be referred to as a term-weighting scheme. One such approach is a term frequency-inverse document frequency analysis, which provides a numerical statistic that reflects the importance of a term to an item (e.g., the importance of a word to a document in a collection or corpus (e.g., in order to be able to identify words of importance in an input data set and an existing data set, in order to compare the two and determine the veracity of the input data set, in support of functionality described elsewhere herein). Such measures can be used as a weighting factor in searches of information retrieval, text mining, item classification, and the like. The value determined increases proportionally to the number of times a term appears in the item in question, and is offset by the number of items in the corpus that contain the term, which helps to adjust for the fact that some words appear more frequently in general. Such approaches can be used as part of a scoring and ranking of a term's relevance to an item, specifically, and/or to a corpus, globally.

As used herein, term frequency represents the frequency with which a given term appears in a given data set (e.g., document). As will be appreciated in light of the present disclosure, differences between items (e.g., textual documents of different length, different types of items (textual document versus presentation/spreadsheet), and so on) may need to be accounted for, and so the use of correction factors in certain embodiments is intended to be comprehended by the present disclosure. Determinations as to term frequency therefore can be described as the weight of a term that occurs in an item, where the more often a term occurs, the greater its weight. Term frequency can represent determinations such as simply the number of occurrences of a term in a given item, the Boolean frequency thereof, a logarithmically scaled frequency, or the like, and can be adjusted to account for variations such as document length and the like.

Also as used herein, inverse document frequency can be taken to be a factor that diminishes the weight of terms that occur very frequently in the document set and increases the weight of terms that occur rarely. Thus, in a statistical sense, the importance of a term can be related, in certain circumstances, to the inverse of a number of items in which the term occurs. Thus, the inverse document frequency represents the importance of the term (or the amount of information the term conveys). In certain embodiments, such an inverse document frequency can be determined as the logarithmically scaled value of the total number of items divided by the number of items containing the term of interest. In so doing, the importance of common terms (or at least, common within the corpus of interest) can be reduced.

Noise filtering can also be performed on the terms thus identified. Such noise filtering can be used to further reduce the impact of common (and so, less important) terms, as such terms appear in the corpus of interest. As will be appreciated in light of the present disclosure, analyses such as those described herein are often faced with situations in which meaningful terms are intermingled with what is referred to herein as noise terms (e.g., with regard to textual terms, words such as "the," "of," "a," and so on). As will also be appreciated, it is desirable to eliminate such terms, in order to improve the accuracy and reliability of such analyses. That being the case, filtering out such noise terms, which can also include spelling errors, abbreviations, non-standard words, repetitions, punctuation, and the like, can be accomplished using semantic analysis, stop-word analysis, tagging, parsing, and other such techniques.

Once noise filtering has been performed on the identified terms (and thus, low-value terms have been removed from the pool of candidate terms), a determination can be made as to the other items in the corpus of interest. In light of the noise filtering performed prior to this inverse document frequency analysis, the efficiency and effectiveness of the inverse document frequency analysis performed on the terms of the ingested item is significantly improved.

When using matching techniques such as those described herein in a given scenario, each component might have the following matching scores:

| Data Component | Score |
|---|---|
| First Name | $x_1$ |
| Last Name | $x_2$ |
| DOB | $x_3$ |
| District ID | $x_4$ |
| State ID | $x_5$ |

Each test result subject is scored for a database subject pair with, for example, a formula of the form:

$$M = k_1 * x_1 + k_2 * x_2 + k_3 * x_3 + k_4 * x_4 + k_5 * x5$$

where $k_1+k_2+k_3+k_4+k_5=1$. For the SAT import, each component is weighted equally against each other, which results in a weighting of 0.2 for each component. For the subject information import (e.g., as may be available from an organization such as a state department of education (Texas Education Agency; as, e.g., Texas Success Initiative Assessment information), DOB may not be present in the data export from subject information source (e.g., for high-school students, a school or other educational institution, the College Board, or other educational source organization), so $k_3$ can be set to 0, while the remaining coefficients are set to 0.25. In certain embodiments, district identifier, state identifier, and/or other such identifiers are weighted more heavily than the names and birth dates, but the aforementioned values have proven to be sufficient, from an empirical perspective. The overall match score (M) will be between 0.0 and 1.0. In implementations in which importance is placed on simplifying the user experience, the overall match score (a combination of the match confidence levels (or match confidences) for each aspect of a given subject to the data being ingested) can be categorized as being a very strong match (between 0.75 and 1.0), a good match (between 0.5 and 0.75), a weak match (between 0.25 and 0.5), and a very weak match (between 0.0 and 0.25). In such an implementation, an overall match score in a certain central range (e.g., 0.4-0.6, 0.45-0.55, or the like) presents the greatest ambiguity, and so, challenge in determining the veracity of the data in question (at least as to identifying the subject to which the information applies/is to be associated with). By contrast, certain levels of match scores can be treated as spurious and disregarded out-of-hand (e.g., an overall match score less than 0.1). At the other end of the spectrum, an overall match score over a certain level (e.g., 0.9) can be treated as being sufficient, such that the data can be treated as being accurate. That said, cases in which various pieces of data match two (or more) subjects with certainty can be marked for review by a human (e.g., as between individuals who are twins, in the case of each of two sets of data can be associated with either of the two individuals). However, it will be appreciated that one advantage sought and provided by methods and systems such as those described herein is the reduction in the need for human review of digital records, which such methods and systems accomplish in the preponderance of circumstances. Such methods and systems accomplish this, at least in part, by reducing the number of situations that result in the need for such intervention, while also not needing identity between ingested data and possible matches.

Such confidence levels can be determined for more than one possible outcome (identified subject), and the results of such possible outcomes ranked. In such implementations, the number of possible subjects identified can be winnowed down by defining a threshold decrease in confidence level from one subject's ranking to that of the next. A relative match score factor (RMSF) can be defined as the ratio of the match confidence level between the data and the higher-ranked subject ($MC_1$), and that between the data and the lower-ranked subject ($MC_2$), such that:

$$RMSF = MC_1/MC_2$$

Empirically, an RMSF of 1.5 or greater has been found to indicate the delineation of potentially accurate data and potentially inaccurate data, sufficient to warrant ignoring subjects with a match confidence level at or below $MC_2$. In the case in which this discontinuity occurs between the two most-highly-ranked subjects, the subject with the higher match confidence level ($MC_1$) can be assumed to be the subject with which the data in question should be associated, at least with respect to the given piece of information (e.g., first name, last name, the identifier in question, etc.). Such an indication in overall match confidence can be used as a proxy for an identical match (empirically, an overall match confidence of 0.9 was found to provide an acceptable error rate (less than 1%)). The use of such a proxy, in turn, allows for the automation of approvals in certain scenarios (e.g., data matching a subject automatically results in the result, certification, etc. being attributed to the subject).

Further, the data ingested into the data cleansing process may itself need to be interpreted. For example, again in the context of subjects who are high school students and columnar data (e.g., database fields), the records of such students may include records from one or more post-secondary educational institutions. In such scenarios, data received from such post-secondary educational institutions may not be intelligible/decipherable as a result of, for example, the ingested data having unidentified fields, missing fields, fields lacking intelligible identification, variation in data formats and field order, and other such problems. However, depending on the data source, certain fields can be assumed as being included in the ingested data. In the present example, while the format and position of such information may vary, a student's last name, first name/initial or student identifier, and course grade (whether numerical or textual) can be assumed to be included in the ingested data. Other information (location of course administration, credit hours offered/earned, instructor, course title, and so on) may or may not appear in the ingested data, but the presence/absence and location of such information must be accounted for, in order to properly interpret and process the ingested data.

Thus, such matching techniques can be of particular advantage in situations in which various providers of subject information intend to convey comparable information, but do so in potentially widely-varying ways. For example, using student records as an example, information regarding reports establishing credit for dual-credit coursework, grade reports, and other reports can vary dramatically from one source of such information to another. As noted, the information that is provided can vary (e.g., by way of including one or more additional fields, omitting one or more fields), as can its presentation (e.g., grades can be presented textually (e.g., letter grades ("A", "B", "C", etc.) with or without modifiers (e.g., "+" or "–"), appearing before or after the letter grade) or numerically ("87"; at varying levels of detail (e.g., by increments (5, 2.5, 1, 0.1, or otherwise), and/or other levels of precision). Moreover, other codes may be included only on certain records (e.g., a "W" for a course from which the given student has withdrawn, "WF" for withdrew/failing, "P" or "F" for pass/fail classes, and so on). Thus, when receiving subject information from such sources, ingestion of such subject information can present challenges.

While subject information from certain sources may include information (e.g., column headings) in the data that may make such subject information easier to decipher, even such headings may vary from one subject information source to another. And the provision of such headings may not even be provided. Thus, while it may be possible to deduce the presence of certain information from the type of report received (e.g., a report on students in a dual-credit program is likely to have information identifying the students, the courses in which those students were enrolled, and the grade those students received in each such course), other facets of such reports (e.g., the order in which that information is presented and the format of each piece of such information, as well as additional information, its format and location, and so on) makes interpreting such reports problematic.

Returning to subject information data cleansing process 1100, one (or more) potential matching subjects are identified by, for example, an analysis of matches and confidence levels are executed and produced, respectively, for each such result (1130). A determination is then made as to whether, based on an analysis such as that described, a subject having a sufficient match confidence level can be identified (1140). As noted, the identified subject will be the subject, if any, identified as having a match confidence level that is sufficient to allow that subject to be sufficiently likely to be the subject with which the subject data (e.g., clinical results, test results, evidence of certification, etc.) should be associated.

If the aforementioned determination(s) result in a match for the given subject, that result is associated with the appropriate subject (e.g., as by forming a selection operation to select the subject) (1150). Alternatively, if no matching subject can be identified (e.g., due to the fact that the information cannot be matched to any existing subject with a sufficient match confidence level), the result is marked for exclusion from the import (1160).

At this juncture, a determination is made as to whether any subject data remains that has not been matched to a subject in the database (the existing subject information), or in the alternative, has not already been excluded from the import (1170). If further subject information remains to be analyzed, subject information data cleansing process 1100 loops to analyzing the next piece of subject information that has been received as a result of the upload of subject information (from the result export in question). Alternatively, if no further results remain, subject information data cleansing process 1100 proceeds to importing these results into the appropriate database(s) (1180), in order to associate such results with the appropriate subjects' record(s). Subject information data cleansing process 1100 then concludes.

Figure 12:
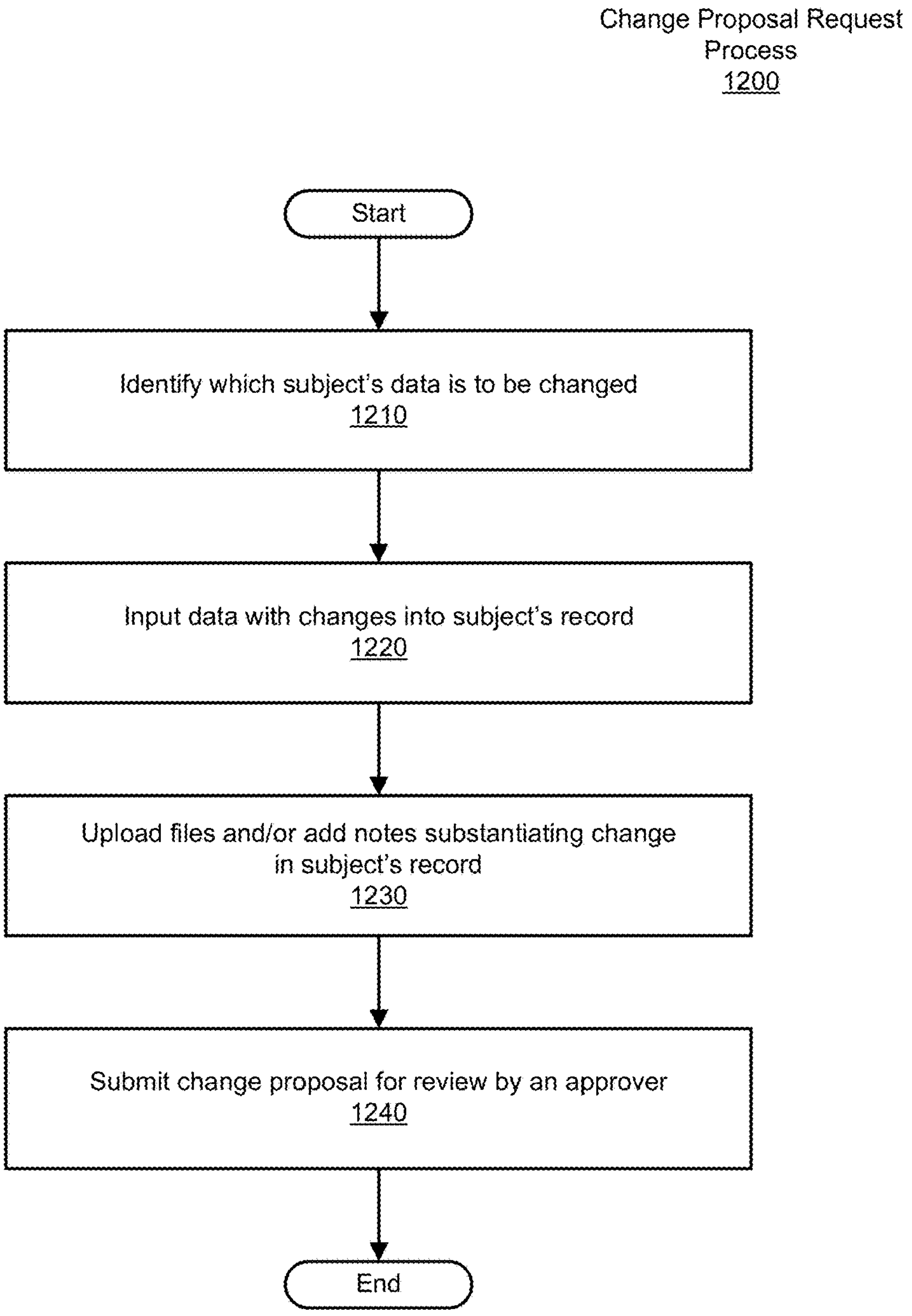
FIG. 12 is a simplified flow diagram illustrating an example of a change proposal request process, according to methods and systems such as those disclosed herein.

FIG. 12 is a simplified flow diagram illustrating an example of a change proposal request process, according to methods and systems such as those disclosed herein. FIG. 12 thus depicts a change proposal request process 1200. Change proposal request process 1200 begins with the identification of the subject whose data is to be changed (1210). Data reflecting one or more changes to the subject's record is then input (1220). In support of such operations, the system's frontend makes a POST request to/api/ibc-change-proposals/to create an IBCChangeProposal record in the database with the proposed data changes, any notes from the form, timestamp of the operation, and the acting user as the acting user as the creator of the change proposal with a null value for the review_result field.

Next, a change approval request creator can upload files or other data, and/or add notes, substantiating the requested change in the subject's record (1230). In this case, if the user indicates that they would like to attach one or more files, the system issues a temporary token for the frontend to upload files to a cloud data store. The frontend then uses the temporary token to upload files to the cloud data store, and can use such information going forward in the maintenance, retrieval, and tracking of such substantiating digital information. The system then associates the uploaded information with the change request record created. The change proposal request is then submitted for review by an improver (1240). Change proposal request process 1200 then concludes.

Figure 13:
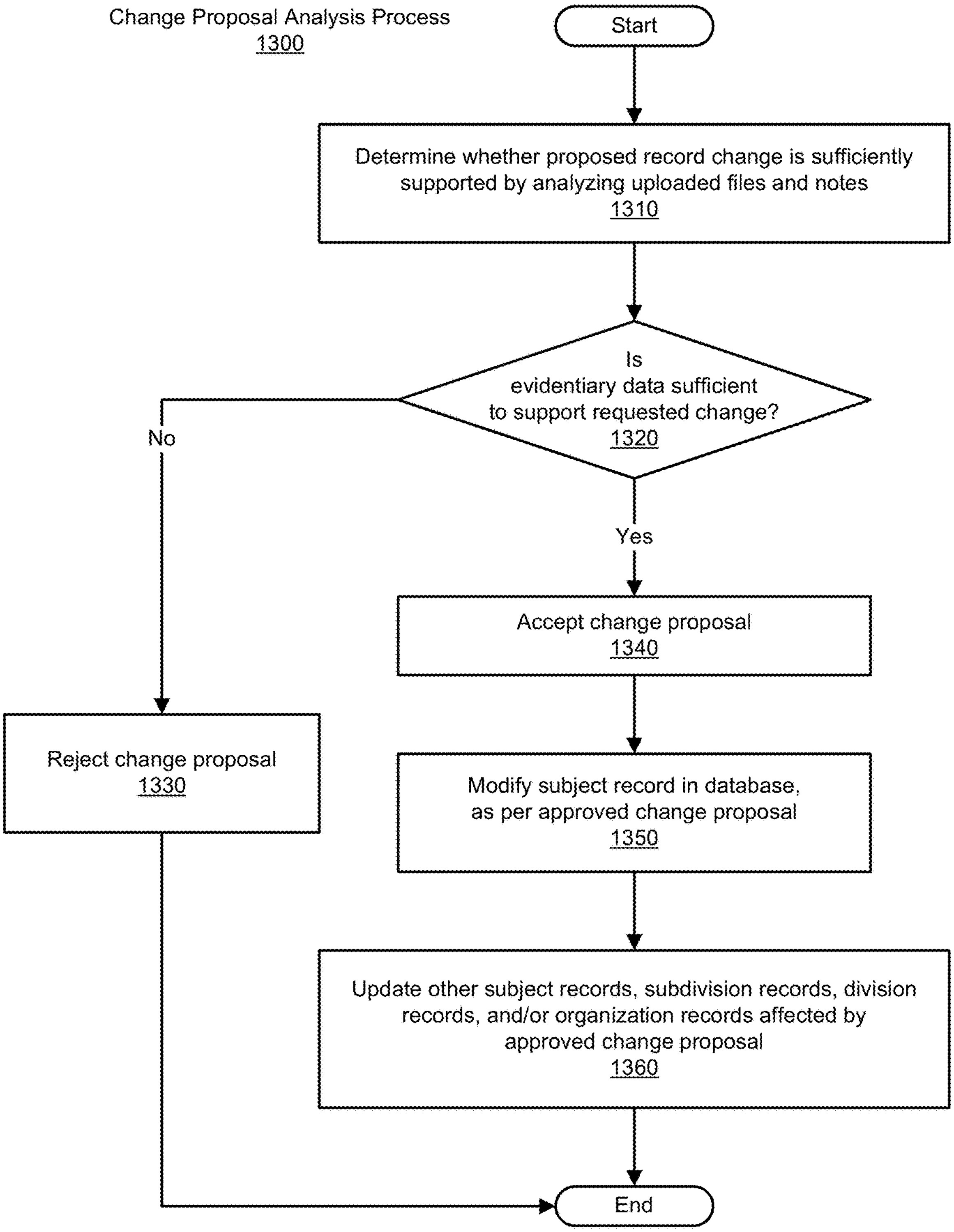
FIG. 13 is a simplified flow diagram illustrating an example of a change proposal analysis process, according to methods and systems such as those disclosed herein.

FIG. 13 is a simplified flow diagram illustrating an example of a change proposal analysis process, according to methods and systems such as those disclosed herein. FIG. 13 thus depicts a change proposal analysis process 1300 change proposal analysis process 1300 begins with a determination as to whether proposed record change is sufficiently supported by the information regarding the requested change (1310). Such a determination can be effected by performing one or more analyses of the files, notes, and other documentation uploaded to the system. Such analyses can include the use of natural language processing and machine learning techniques in order to analyze the various pieces of digital substantiation data (e.g., such as that described in connection with FIG. 9). Next, such systems (with or without input) makes a determination as to whether the evidentiary data provided adequately supports the proposed record change (1320). In the case in which the evidentiary data submitted does not adequately support the proposed record change, the change proposal request can be rejected (1330). In one embodiment, the system's frontend makes a POST request to/api/ibc-change-proposals/123/rejection/. In response, the system's backend updates the change proposal record to mark the acting user to be the reviewer, the timestamp for when the review took place, and the review status to be rejected. Change proposal analysis process 1300 then concludes.

Alternatively, if the evidentiary data presented adequately supports the proposed record change (1320), the change proposal can be accepted (1340). The affected subject record can then be modified in the database, as per the approved change (1350). At this juncture, other subject records, subdivision records, division records, and/or organization records affected by the approved change can also be updated (1360). In this manner, an accepted change proposal can result in effects that are propagated through various entities within the organization. The change proposal having been accepted, and its effects can then be propagated to other entities within the organization. In this instance, the system's frontend makes a POST request to/api/ibc-change-proposals/123/approval/. In response, the system's backend updates the change proposal record to mark the acting user to be the reviewer, the timestamp for when the review took place, and the review status to be approved. If the change proposal was for showing that the student has obtained an industry-based certification, the backend will update the Student Certification table to show that the student has obtained the certification in the change proposal. If the change proposal was for showing that the student is pursuing the industry-based certification, the record will be updated to show that the student is pursuing the certification. Change proposal analysis process 1300 then concludes.

FIG. 14 is a simplified block diagram illustrating an example of a change proposal request message format, according to methods and systems such as those disclosed herein. FIG. 14 thus depicts a change proposal request message format 1400. Change proposal request message format 1400, as presented in FIG. 14, is a hypertext transfer protocol (HTTP) message. A message formatted according to change proposal request message format 1400 can be presented to the system for ingestion using an HTTP POST command change proposal request message format hundred includes an HTTP header 1410 and an HTTP body 1420, as depicted in FIG. 14.

Example Implementations of a Metrics Dashboard

Embodiments of methods and systems such as those described herein, given their capabilities as to subject information management, are also able to provide data analysis and presentation of information regarding subjects, such as outcome projections, outcome trends, analysis of historical data, and other such functionalities. Such metrics dashboard functionalities provide decision-support systems to program administrators, allowing such users to see a subject's progress, determine the subject's trajectory with regard to one or more certifications (e.g., whether the subject is progressing at an acceptable rate (or at least a rate of progress that is sufficient to the attainment of a given goal in the allotted amount of time (e.g., CCMR data such as a student's rate of progress toward a given certification prior to attaining a certain grade level, or prior to graduation from high school)). In so doing, methods and systems such as those described herein provide such users with the ability to perform analyses, generate presentations of subject information, and the like, based, at least in part, on parameters (e.g., machine learning weights, biases, coefficients, and other such parameters) and the like, to effectively, efficiently analyze subject data generated by such methods and systems.

For example, in certain embodiments, the statuses reflected in student records are not simply a value that can be captured as a binary "yes" or "no" with regard to whether the student has completed a certain certification, action, or other such activity. Thus, an intermediate state can be employed to indicate that, for example, the student is in the process of completing the activity or has the potential to do so. This means that several characteristics of a subject's performance can be presented, among them: the activities that the subject has completed and those that the subject has the potential to complete. A subject's completed activities, their progress towards completing other activities in the allotted time period, and activities the subject might undertake and complete in the allotted time period, can be used to determine lower outcome bounds and upper outcome bounds. Using such lower and upper outcome bounds, an accountability outcome range can be determined for a given point in time. This accountability outcome range represents a range of outcomes that are likely with a given level of confidence. For example, a subject's already-completed activities represents a lower outcome bound with a confidence level of 100%, while that plus one activity the subject has a 50% chance of completing in the allotted time period (that between a first point in time and a second, subsequent point in time, at which the accountability outcome range is being determined) might be 75%. By altering the time period in question, the activities completed, the activities being pursued, the activities that could be pursued, and/or other such factors (including other commitments of the subject), a realistic, "what-if" analysis can be performed, in order to advise the subject more appropriately as to the activities the subject might undertake, for example.

In the context of CCMR data in an educational setting (e.g., that of a school or school district), this allows for the presentation of such lower and upper outcome bounds, with respect to the activities such as certifications, which the student can be expected to have completed in a given amount of time. For example, the activities a given student is certain to have completed within the allotted time period (e.g., the activities that the student has already completed at the given point in time) acts as the lower outcome bound, and those that the student could reasonably be expected to have completed within the allotted time period (e.g., an optimistic scenario, in which the given student with the potential for completing an activity actually completes that activity, for all such activities that might be either already begun and/or applicable to the student) acts as the upper outcome bound. In such an embodiment, the additional status of "pursuing" (and potentially, of information as to the tasks and subtasks completed, the percentage of the activity that the subject has completed, and so on) allows methods and systems such as those described herein to present such lower and upper outcome bounds as part of such students' accountability scores, their outcomes, potential bonus awards, and/or other outcomes-based measures. In such embodiments, for CCMR outcomes in a graduating class of a school or school district, a raw score (e.g., a credit of "1" for each student that completes an activity in one of the CCMR indicators) divided by the total number of graduates, which can be represented as a percentage. Such raw scores can then be scaled with respect to other such respective entities (e.g., other schools in a school district, other school districts in a state, or some such), in order to "grade" the raw score in relation to those other entities. In a situation in which an outcome bonus is awarded, a determination can be made, using the information gather by methods and systems such as those described herein, with regard to the number of students beyond certain thresholds (which can be adjusted to reflect different demographics) that are determined against the state as a whole. Such methods and systems are able to provide a high and low projection, which can be based, at least in part, on the "obtained" vs "pursuing" status indicators for the given students and activities. A graphical example of such information is now described.

Figure 15:
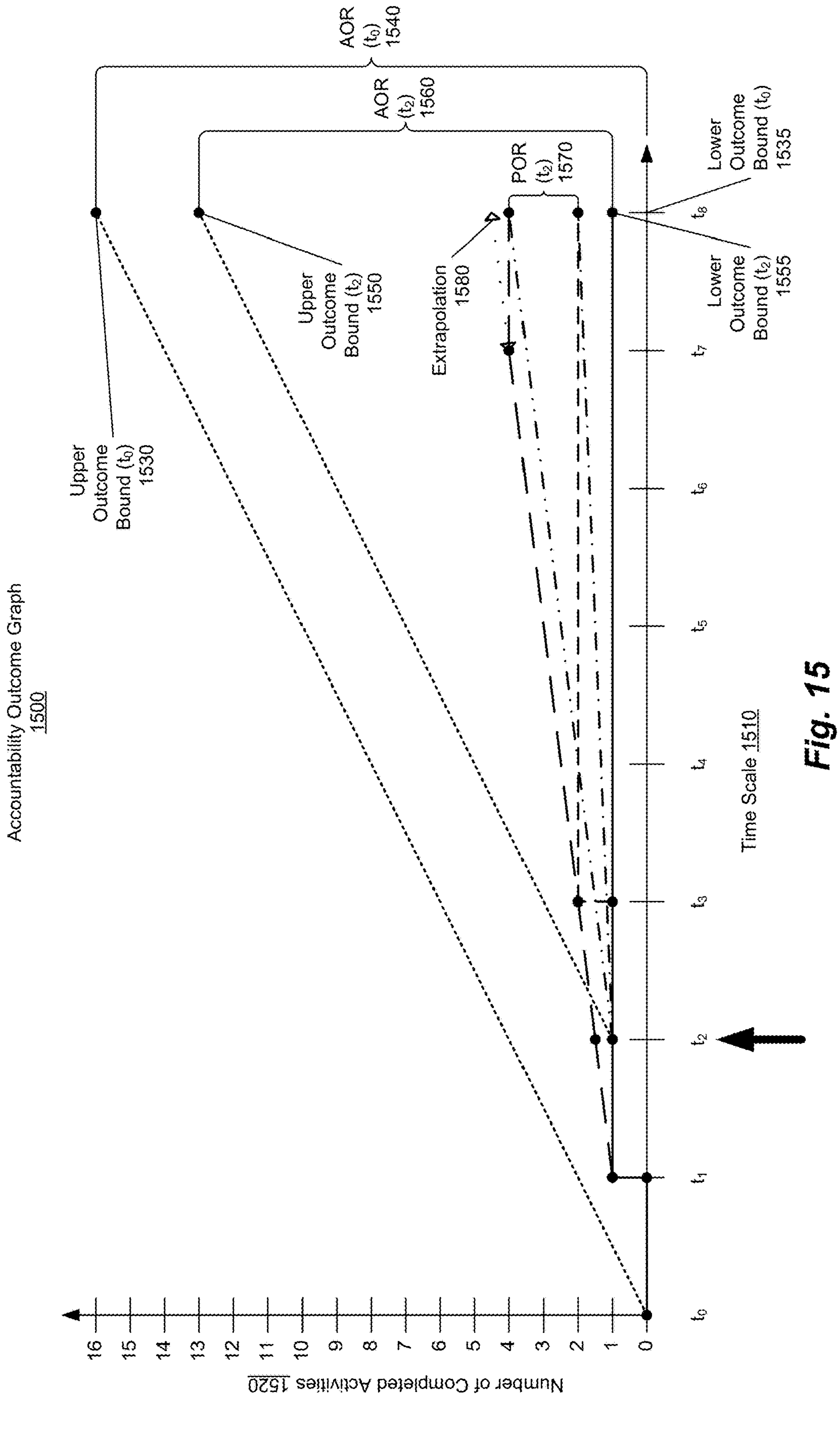
FIG. 15 is a block diagram depicting an accountability outcome graph, according to embodiments of systems such as those disclosed herein.

FIG. 15 is a block diagram depicting an accountability outcome graph, according to embodiments of systems such as those disclosed herein. FIG. 15 thus depicts an accountability outcome graph 1500. Accountability outcome graph 1500, in the embodiment depicted in FIG. 15, includes two axes, a timescale 1510 and a number of completed activities 1520 timescale 1510 is marked in a number of time increments ($t_0$-$t_8$), which might represent, for example, the number of semesters a student might be in high school. Number of completed activities 1520 represents the number of activities completed by a student (e.g., the number of certifications the student has completed). Starting at the beginning of the student's high school career (at time $t_0$), a reasonable upper limit to the number of activities student might reasonably expect to complete during their high school career of eight semesters might be 16 activities completed (i.e., at a rate of two activities completed per semester). This leads to an upper outcome bound 1530 of 16 completed activities. At this point, having not completed any activities, a student's lower outcome bound would be zero (depicted in FIG. 15 as a lower outcome bound 1535). Based on upper outcome bound 1530 and lower outcome bound 1535, an accountability outcome range (AOR) 1540 can be defined (for $t_0$).

In the example depicted in FIG. 15, the student in question begins work on a first activity at time to and completes this activity at time $t_1$ (i.e., the student completes the first activity in their first semester). Also at time $t_1$, the student begins a second activity, which is ultimately completed at time $t_3$. At time $t_2$ (as indicated by a large arrow), the student has completed the first activity and is progressing to completion of the second activity. Thus, at this juncture (and at the aforementioned maximum rate of progress), the maximum number of activities student might be reasonably expected to complete is 13, as indicated by an upper outcome bound of 1550. By the same token, the minimum number of activities the student could be expected to have completed by the end of their high school career would be that activity already completed, setting a lower outcome bound 1555 of one. Upper outcome bound 1550 and lower outcome bound 1555 thus define and accountability outcome range 1560 of from one activity completed to up to 13 activities completed. That said, it seems likely that the student will complete more activities than lower outcome bound 1555 suggests, but is unlikely to reach upper outcome bound 1550 of activities completed. Using techniques such as those described subsequently herein, a more realistic outcome range can be determined. Thus, a probable outcome range 1570 can be defined at time $t_2$ by making certain assumptions (e.g., that the student completes the second activity, that the student maintains a rate of progression on subsequent activities comparable to that demonstrated with regard to the first two activities, and so on). Further, it is to be appreciated that such assumptions cannot (or at least should not) lead to partially-completed activities at the end of the student's tenure. Thus, the number of activities would be expected to be completed in a given number of increments. This is illustrated by the discrepancy between an extrapolation 1580 and the upper outcome bound of probable outcome range 1570.

Moreover, it will be appreciated that the accountability outcome ranges described above are subject not only to variable factors that include the time period in question, activities yet to be completed, and activities available to the subject but yet to be undertaken, but also a variety of factors outside the scope of the context in question (e.g., in the case of students at a school, socioeconomic background, other commitments, school work, work outside of school, and other such considerations). That being the case, the accountability outcome range for a given student or set of students can vary unpredictably as a result of such unknowns. However, from a more macro standpoint, such unknowns can be accounted for, to some extent, based on the outcomes observed with respect to experiences with earlier subjects. To this end, outcome and other information can be analyzed to good effect, seeing machine learning techniques.

Figure 16:
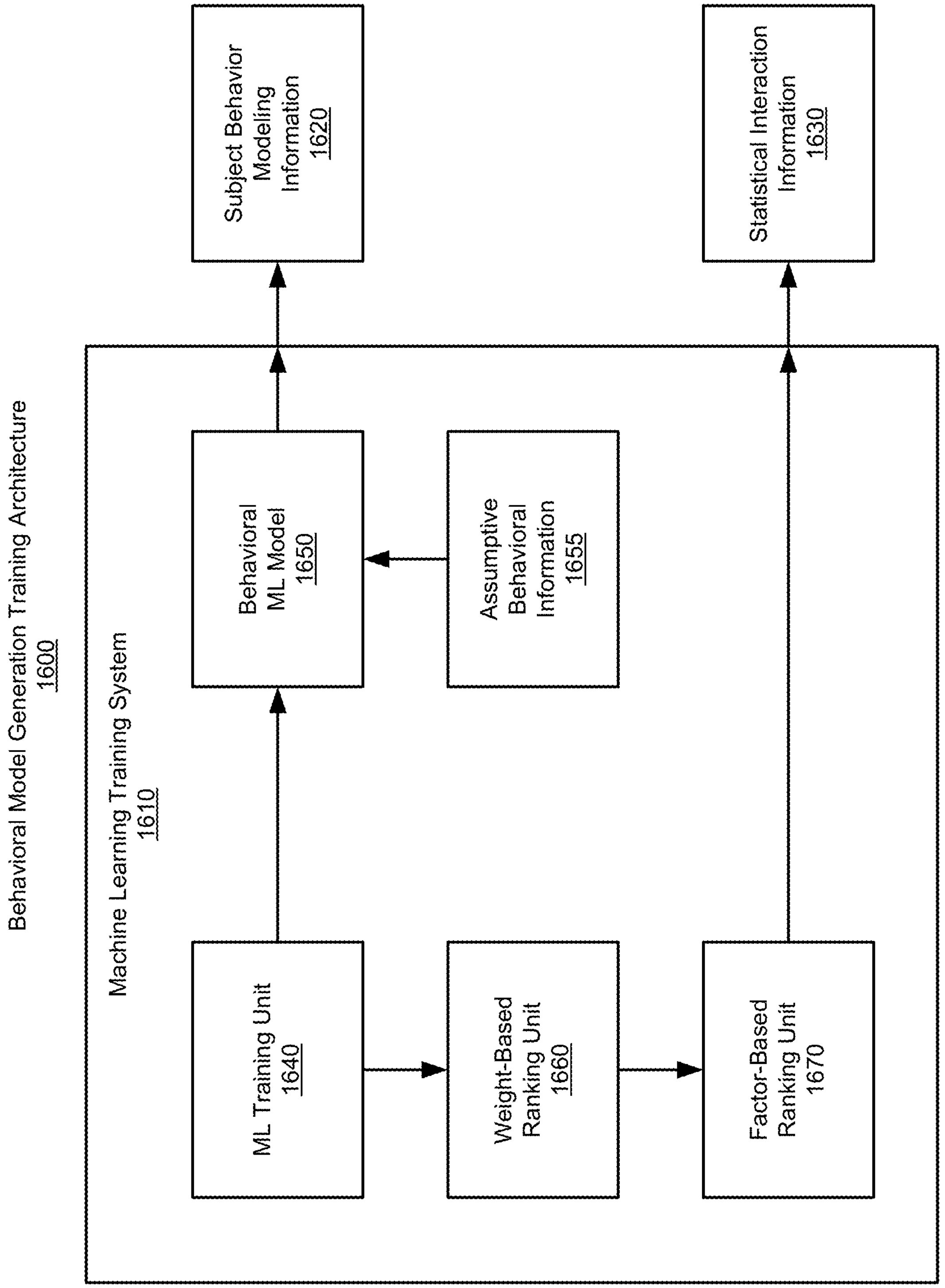
FIG. 16 is a simplified block diagram illustrating an example of a behavioral model generation training architecture, according to methods and systems such as those disclosed herein.

FIG. 16 is a simplified block diagram illustrating an example of a behavioral model generation training architecture, according to methods and systems such as those disclosed herein, as might be used to train behavioral model generation unit 780. FIG. 16 thus depicts a behavioral model generation training architecture 1600, which includes a machine learning training system 1610. Machine learning training system 1610 generates subject behavior modeling information 1620 and statistical interaction information 1630. In so doing, behavioral model generation training architecture 1600 is able to "learn" from the behavior of subjects, and so provide some level prediction as to the outcomes that other, similarly situated subjects may experience. Further, such techniques can be used to cleanse subject data by learning not only the likelihood of a given piece of information containing an error (or conversely, the accuracy of a given piece of information), but also the types of errors (error type) a given piece of information is likely to contain, and do so based on the source of the subject information. For example, such a system may determine that, when received from a particular district office, a subject's first name is likely to vary between a full first name, nickname (or shortened version of the subject's first name), and a first initial, but is unlikely to be misspelled. Having learned this, the machine learning system can more easily distinguish between the foregoing three alternatives, knowing that a shortened version of the subject's first name is likely to be just that, rather than a misspelling. These and other machine learning analysis operations allow methods and systems such as those described herein to process more subject information automatically (without human intervention, nor interpretation of subject information), thereby resulting in subject information processing that is faster, more efficient, and more accurate, than would otherwise be possible in the computerized processing of subject information.

In order to generate subject behavior modeling information 1620 and statistical interaction information 1630, machine learning training system 1610 includes a machine learning (ML) training unit (depicted in FIG. 16 as an ML training unit 1640), which is communicatively coupled to a machine learning model (depicted in FIG. 16 as a behavioral ML model 1650) that also can take as input assumptive behavioral information 1655. In one implementation, ML training unit 1640 is implemented using a multi-layer perceptron (MLP) architecture that employs regularization. As such, ML training unit 1640 can be a feedforward artificial neural network model that maps large sets of input data (e.g., information regarding various performance characteristics exhibited by objects) onto a set of appropriate outputs. As will be appreciated in light of the present disclosure, assumptive behavioral information 1655 can include various (expected) values for various of these behavioral characteristics. ML training unit 1640 can include multiple layers of nodes in a directed graph, with each layer fully connected to the next. Except for the input nodes, each node acts as a neuron (or processing element) with a nonlinear activation function. As will be further appreciated, MLP techniques can provide salutary effects in the methods and systems such as those described herein due at least in part to the ability of such techniques to solve problems stochastically, which is able to allow approximate solutions for extremely complex problems such as fitness approximations of the behavioral characteristics described herein. Such MLP techniques are well-suited to situations such as those considered herein, at least as a result of the large number of parameters involved in each of the possible factors affecting subject behavior in these various circumstances, particularly when interactions between such parameters are considered. That being the case, such solutions can facilitate not only improvements in the prediction of subject behavior, but also in the efficiency and overall accuracy of the process by which such predictions are reached.

ML training unit 1640 thus receives inputs from ML training unit 1640 and assumptive behavioral information 1655. ML training unit 1640 determines the impact of various behavioral factors (e.g., socioeconomic conditions, school work, work and activities outside of school, behavioral issues, and other such factors) on subject behavior with respect to the subject's environment, and maps information that may affect subject behavior as data sets, onto corresponding output sets. Such output sets can include individual parameters, attributes, and other factors that can impact subject behavior, as well as combinations of factors impacting subject behavior. ML training unit 1640 generates a machine learning model (depicted in FIG. 16 as a behavioral ML model 1650), and so is communicatively coupled thereto. ML training unit can perform such generation by mapping the aforementioned output sets onto behavioral ML model 1650 as an MLP model. In so doing, such mapping of the output sets into the MLP model is dynamic and automatic, and so can be accomplished without human intervention.

That being said, behavioral ML model 1650 will typically take assumptive behavioral information 1655 as input. Behavioral ML model 1650 can thus include data that is based on organization-provided data (e.g., socioeconomic information, test scores, career counseling, and other such information), as part of the training operations performed. One or more constraints may also be set. ML training unit 1640 can then vary one or more configuration parameters, environmental parameters, and/or other parameters to take such constraints into consideration.

Behavioral ML model 1650 can thus map output sets to generate an MLP model. Behavioral ML model 1650 will typically include multiple layers of nodes in a directed graph or graphs, with each layer fully connected to the next. This neural network can be used to identify predicted subject behaviors and circumstances that may affect outcomes, and can account not only for the given set of conditions, but also the interactions between such conditions. Behavioral ML model 1650, having interacted with ML training unit 1640 and having received assumptive behavioral information 1655, can then be used to produce subject behavior modeling information 1620. As will be appreciated in light of the present disclosure, a determination can be made as to whether subject behavior modeling information 1620 appears to be sufficiently accurate (e.g., such that a given threshold for accuracy is met or exceeded). In this manner, a feedback loop of sorts is effected, wherein behavioral ML model 1650 can be adjusted based on the sufficiency of subject behavior modeling information 1620, in order to arrive at a machine learning model that provides the requisite level of confidence in its output. The information that results can then be used to inform a subject behavior model such as subject behavior model 555 (e.g., in its initial use for a given event and set of attendees (subjects)).

ML training unit 1640 also provides information to a weight-based ranking unit 1660, which uses this information to generate weighting information. Such weight-based ranking is described in further detail in connection with FIG. 17, subsequently. ML training unit 1640 communicates information, such as the impacts on subject behavior that have been determined, to weight-based ranking unit 1660. Weight-based ranking unit 1660 assigns a weight to each parameter based on the parameter's impact on the given subject's behavior(s) within the environment in question.

Weight-based ranking unit 1660 assigns a weight to each interaction of the parameters with the environment based on the interaction's impact on the subject's behavior. Weight-based ranking unit 1660 then compares the effects of such interactions, based on various sets of parameters.

Weight-based ranking unit 1660 can, for example, assign a magnitude value of weight based on the impact of a given factor's effect on a given subject's expected outcomes. A larger weight value is assigned to certain factors (e.g., test scores) than other factors (e.g., work experience). The ranking of such factors by weight-based ranking unit 1660 is then performed by interpreting the weights assigned thereto. Weight-based ranking unit 1660 provides these results to an interaction-based ranking unit 1670.

Interaction-based ranking unit 1670 ranks the weighted interactions based on the magnitudes of the weights produced by weight-based ranking unit 1660. Factor-based ranking unit 1670 determines a strength for each weighted factor. That being the case, a first weighted factor having a larger magnitude than a second weighted factor is assigned a higher order in the ranking. The strengths assigned to the factors produced by factor-based ranking unit 1670 can be stored as statistical interaction information 1630. Statistical interaction information 1630 thus represents the nature of the various factors as they apply to the given subject, from statistical perspective.

Figure 17:
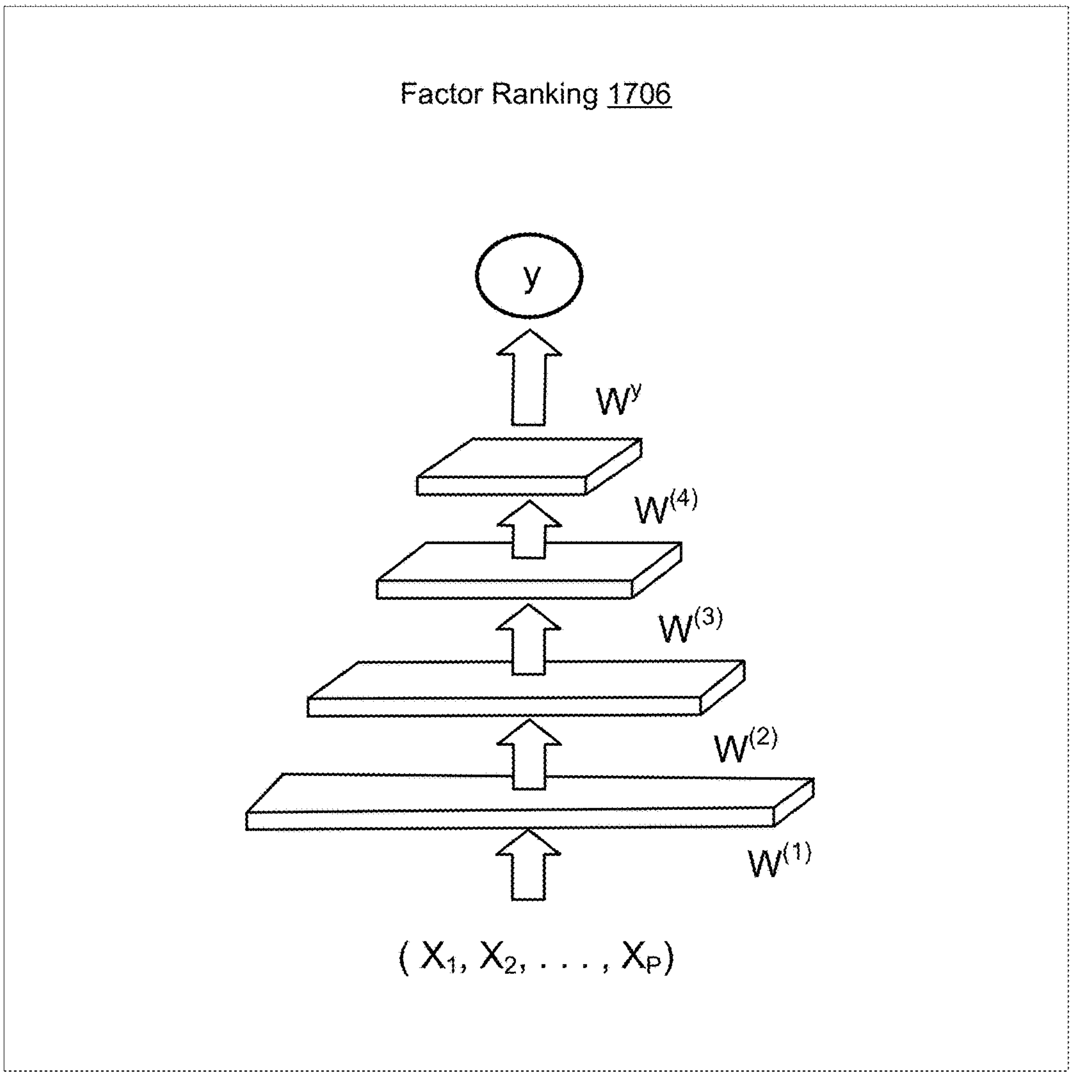
FIG. 17 is a simplified diagram illustrating an example of a ranking system, according to methods and systems such as those disclosed herein.

FIG. 17 is a simplified diagram illustrating an example of a factor ranking system for ranking factors based on weighted factors, according to methods and systems such as those disclosed herein. FIG. 17 thus illustrates a factor ranking system 1700 including the ranking factors by interpreting one or more weight components. The ranking of such factors by interpreting weight components assigns weights to each of the attributes or parameters that impact the given subject's behavior, for example. The ranking of such factors using weight components assigns weights to each factor/combination of two or more attributes/parameters that may have a meaningful impact on the subject's behavior. For example, the attributes or parameters can be associated with a subject in a manner that is more likely to result in the given subject completing more activities (e.g., one student might progress more quickly if the frequency with which the student meets with a counselor is increased, while another student might experience the opposite effect). A ranking unit (e.g., factor-based ranking unit 1670 of FIG. 16) assigns a weight to each such factor for each of the factors. The ranking unit can assign a weight to factors between a subject and various facilities/personnel available thereto, but can also consider factors between the attributes, parameters, and other such characteristics of the subjects and their circumstances. Weights are assigned based on the impact of the given attribute(s), parameter(s), factors, and or the like, as well as one or more combinations thereof. Through the use of machine learning systems such as those described herein, the ranking unit is able to rank such attributes, parameters, and their factors based on the assigned weights. The weighted attributes, parameters, factors, and the like, which can be used to rank their impacts on subject behavior. A magnitude value can be assigned to the weighted attributes, parameters, and factors, and so the weighted attributes, parameters, and factors can be ranked based on their magnitude values.

For example, as shown in FIG. 17, $X_I$ can represent the attribute, the parameter, or other factor as an input to the ranking factors by interpreting the weights components shown as part of factor ranking 1706, where I=1, 2, . . . P. In this example, $X_1, X_2, \ldots X_P$ are treated as factors between various combinations of subjects. The variable Y can be treated as the impact on the organizer's and subjects' expected feedback regarding the subgrouping, where Y=1, 2, . . . y. W(1), W(2), . . . W(y) are thus the weights assigned to the factors according to their impact on this feedback. By assigning the weights to the attributes, parameters, and other factors, changes in such feedback resulting from the effects of various combinations of such attributes, parameters, and other factors can be used by the machine learning system to predict subject behavior for the given factors.

Figure 18:
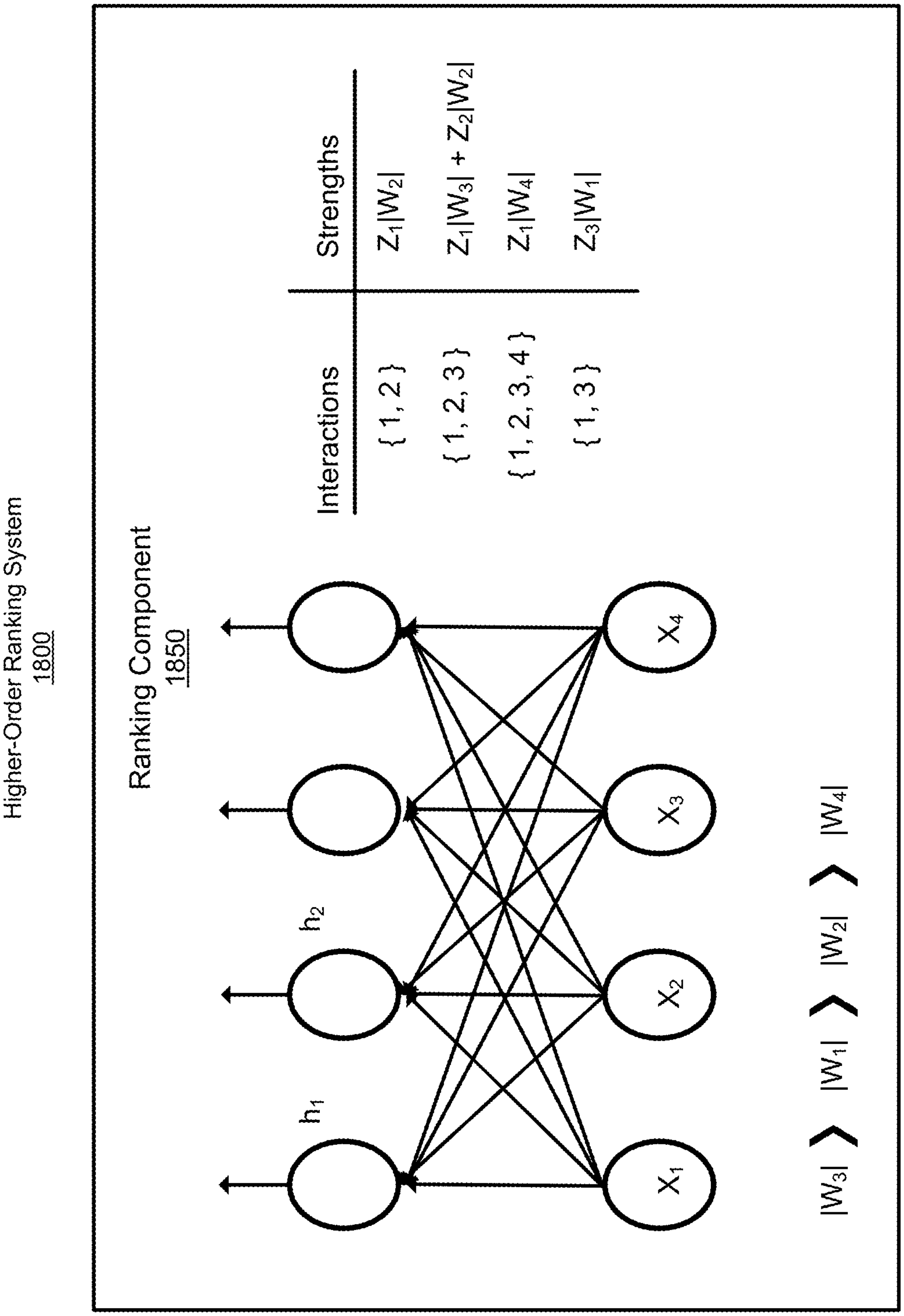
FIG. 18 is a simplified diagram illustrating an example of a higher-order ranking system, according to methods and systems such as those disclosed herein.

FIG. 18 is a simplified diagram illustrating an example of a higher-order ranking system for ranking attributes, parameters, and other factors, based on their impacts on subject behavior, according to methods and systems such as those disclosed herein. FIG. 18 thus depicts a higher-order ranking system 1800 that includes a ranking component 1850. Ranking component 1850 ranks the attributes, parameters, and other factors as higher-order interactions based on their strengths (their impacts, individually and in various combinations, on the subject behaviors). The attributes, parameters, and other factors are, in this example, treated as the inputs $X_1$, $X_2$, $X_3$, and $X_4$. For example, the $X_1$, $X_2$, $X_3$, and $X_4$ inputs can be factors such as organization goals, subject goals, subject attributes, socioeconomic conditions, existing commitments, and other such factors. $W_1$, $W_2$, $W_3$, and $W_4$, in this example, are the weights corresponding to the inputs $X_1$, $X_2$, $X_3$, and $X_4$. Z, in this example, is a factor applied to the inputs based on the type of the attribute or parameter. Ranking component 1850 ranks the interactions of the inputs $X_1$, $X_2$, $X_3$, and $X_4$ higher-order interactions (such as $h_1$, $h_2$, . . . ) based on the strengths, such as the magnitude value of the impact on the subject behavior.

Figure 19:
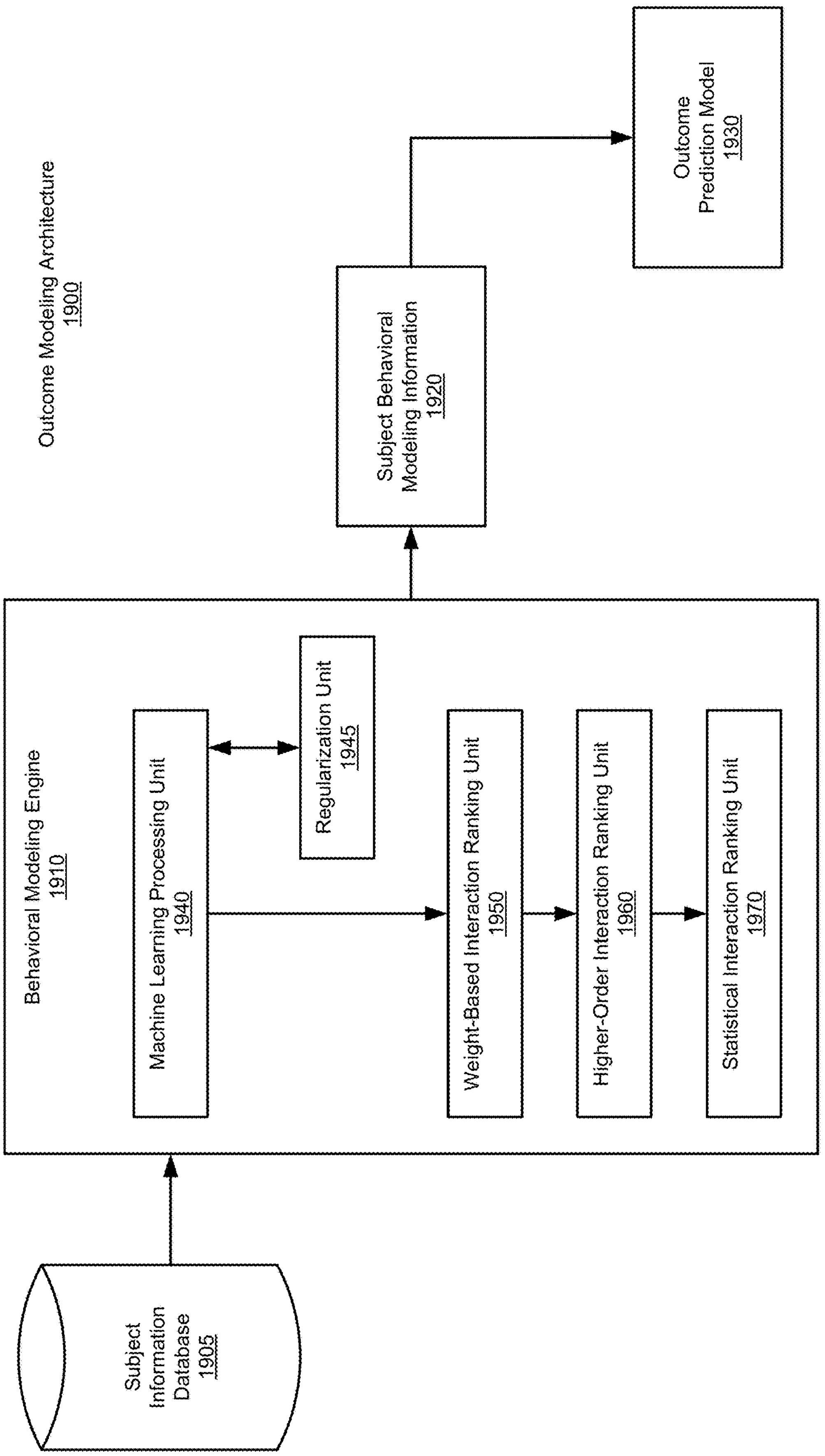
FIG. 19 is a simplified block diagram illustrating an example of an outcome prediction architecture, according to methods and systems such as those disclosed herein.

FIG. 19 is a simplified block diagram illustrating an example of an outcome prediction architecture, according to methods and systems such as those disclosed herein. FIG. 19 thus depicts an outcome prediction architecture 1900. As will be appreciated in light of the present disclosure and FIG. 19, outcome prediction architecture 1900 can be implemented, for example (and more specifically), as a multi-layer perceptron (MLP) machine learning architecture. Information from a subject information database 1905 provides subject information to a behavioral modeling engine 1910. In turn, behavioral modeling engine 1910 produces subject behavioral modeling information 1920 (which can be, e.g., an MLP model). Results from the processing of subject behavioral modeling information 1920 can then be made available as an outcome prediction model 1930. Outcome prediction model 1930 can then be used by a certification server such as certification server 270 to analyze certification and other information, in order to provide outcome predictions, what-if analyses, and other functionality to users of such systems.

In order to produce the requisite information for ingestion as outcome prediction model 1930, behavioral modeling engine 1910 includes a machine learning processing unit 1940, which can be implemented, for example, as a multi-layer perceptron (MLP) processing unit. Machine learning processing unit 1940 is coupled to communicate with a regularization unit 1945. Regularization unit 1945, in certain embodiments, implements a process of adding information to that received by machine learning processing unit 1940, in order to address problems with insufficiently defined information (in behavioral modeling engine 1910, for example, a lack of certain measurements, factors with excessive variability, and the like) and/or to prevent overfitting (the production of an analysis that corresponds too closely or exactly to a particular set of data, and may therefore fail to fit additional data or predict future observations reliably; in behavioral modeling engine 1910, for example, scenarios in which machine learning model 1920 would otherwise be tied too closely to a given factor such that the model's overdependence on that factor would result in an unacceptably high sensitivity to changes in that factor, as between a given factor that might vary widely as between subjects (e.g., for a given set of certifications, certain test scores might vary widely, but not be especially determinative with respect to those certifications; thus, a scenario in which such test scores closely followed outcomes as a matter of happenstance, might otherwise prove problematic to the prediction of outcomes)). For example, an MLP network with large network weights can be a sign of an unstable network, where small changes in the input can lead to large changes in the output. This can be a sign that the network has "over fit" the training dataset, and so is more likely perform poorly when making predictions on new data. A solution to this problem is to update the learning algorithm to encourage the network to keep the weights small. This is called weight regularization and it can be used as a general technique to reduce overfitting of the training dataset and improve the generalization of the model. As will be appreciated in light of the present disclosure, given the potential for wide variability in factors such as organizer and subject goals, subject feedback, subject attributes, and other such factors, the benefits of regularization in applications such as those described herein will be evident.

In support of the generation of subject behavioral modeling information 1920 (and so, outcome prediction model 1930), ML processing unit 1940 also produces information that is communicated to a weight-based interaction ranking unit 1950. Weight-based interaction ranking unit 1950 generates weight-based interaction ranking information, that is, in turn, provided to a higher-order interaction ranking unit 1960, for purposes and to effect such as those described earlier. In turn, having generated higher-order interaction ranking information, higher-order interaction ranking unit 1960 communicates such information to a statistical interaction ranking unit 1970. In so doing, behavioral modeling engine 1910 is able to appropriately weight relevant factors, and produce statistical information that allows subject behavioral modeling information 1920 to be used in creating subject behavioral information 1920 in such a manner that uncontrolled swings in outcome predictions produced using subject behavioral modeling information 1920 (and ultimately, outcome prediction model 1930) are avoided.

Example Computing and Network Environments

As shown above, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 20 and 21.

Figure 20:
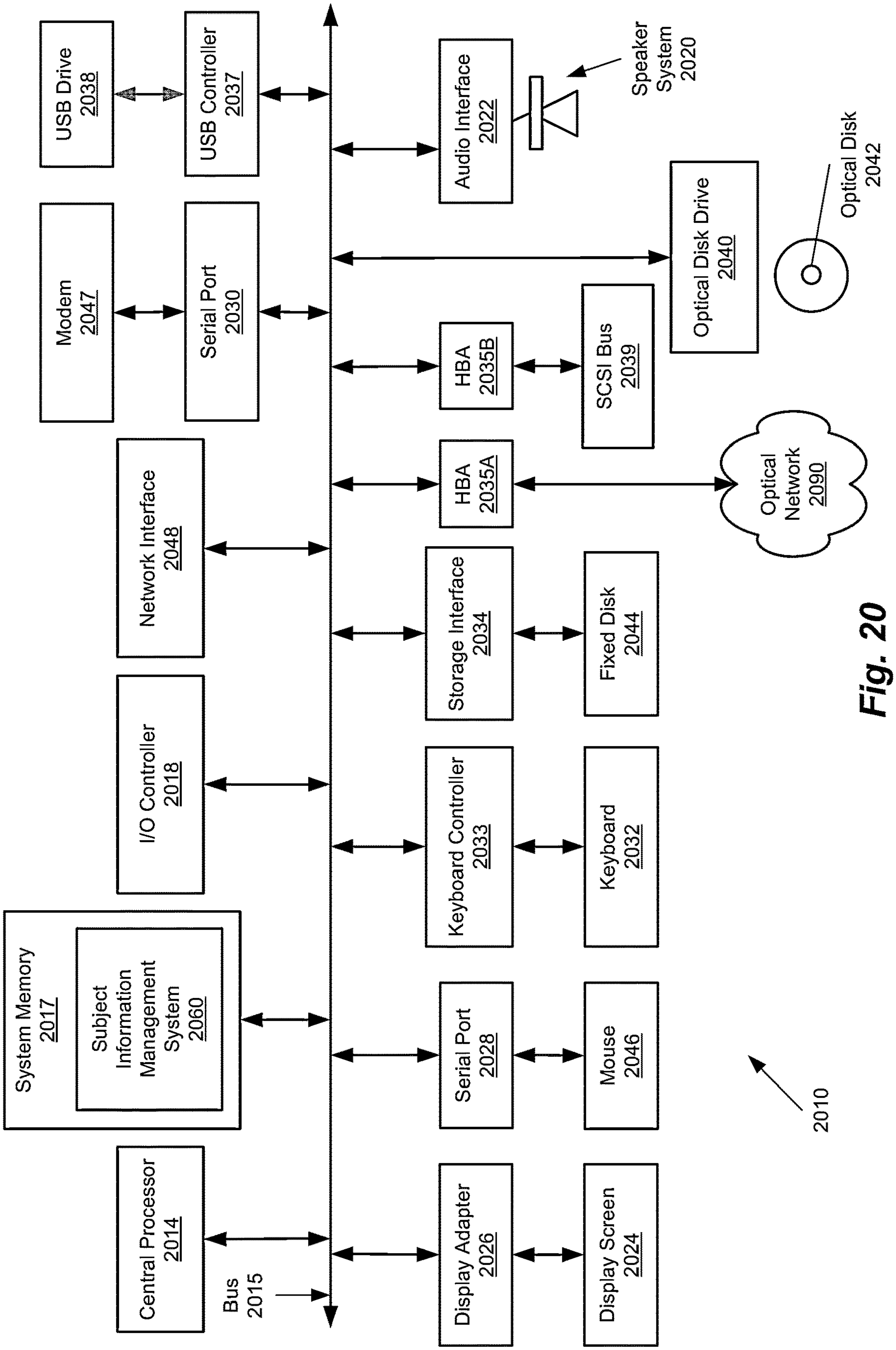
FIG. 20 is a block diagram depicting a computer system suitable for implementing aspects of systems according to embodiments of systems such as those disclosed herein.

FIG. 20 depicts a block diagram of a computer system 2010 suitable for implementing aspects of the systems described herein, and so can be viewed as an example of a computing device supporting a microservice production management server, for example. Computer system 2010 includes a bus 2012 which interconnects major subsystems of computer system 2010, such as a central processor 2014, a system memory 2017 (typically RAM, but which may also include ROM, flash RAM, or the like), an input/output controller 2018, an external audio device, such as a speaker system 2020 via an audio output interface 2022, an external device, such as a display screen 2024 via display adapter 2026 (and so capable of presenting microservice dependency visualization data such as microservice dependency visualization data 225 as visualization 1000 in FIG. 10), serial ports 2028 and 2030, a keyboard 2032 (interfaced with a keyboard controller 2033), a storage interface 2034, a USB controller 2037 operative to receive a USB drive 2038, a host bus adapter (HBA) interface card 2035A operative to connect with an optical network 2090, a host bus adapter (HBA) interface card 2035B operative to connect to a SCSI bus 2039, and an optical disk drive 2040 operative to receive an optical disk 2042. Also included are a mouse 2046 (or other point-and-click device, coupled to bus 2012 via serial port 2028), a modem 2047 (coupled to bus 2012 via serial port 2030), and a network interface 2048 (coupled directly to bus 2012).

Bus 2012 allows data communication between central processor 2014 and system memory 2017, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 2010 are generally stored on and accessed from a computer-readable storage medium, such as a hard disk drive (e.g., fixed disk 2044), an optical drive (e.g., optical drive 2040), a universal serial bus (USB) controller 2037, or other computer-readable storage medium.

Storage interface 2034, as with the other storage interfaces of computer system 2010, can connect to a standard computer-readable medium for storage and/or retrieval of information, such as a fixed disk drive 2044. Fixed disk drive 2044 may be a part of computer system 2010 or may be separate and accessed through other interface systems. Modem 2047 may provide a direct connection to a remote server via a telephone link or to the Internet via an internet service provider (ISP). Network interface 2048 may provide a direct connection to a remote server via a direct network link to the Internet via a POP (point of presence). Network interface 2048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 20 need not be present to practice the systems described herein. The devices and subsystems can be interconnected in different ways from that shown in FIG. 20. The operation of a computer system such as that shown in FIG. 20 is readily known in the art and is not discussed in detail in this application. Code to implement portions of the systems described herein can be stored in computer-readable storage media such as one or more of system memory 2017, fixed disk 2044, optical disk 2042, or floppy disk 2038. The operating system provided on computer system 2010 may be WINDOWS, UNIX, LINUX, IOS, or another operating system. To this end, system memory 2017 is depicted in FIG. 20 as executing a subject information management system 2060, in the manner of the systems discussed previously herein, for example.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 21:
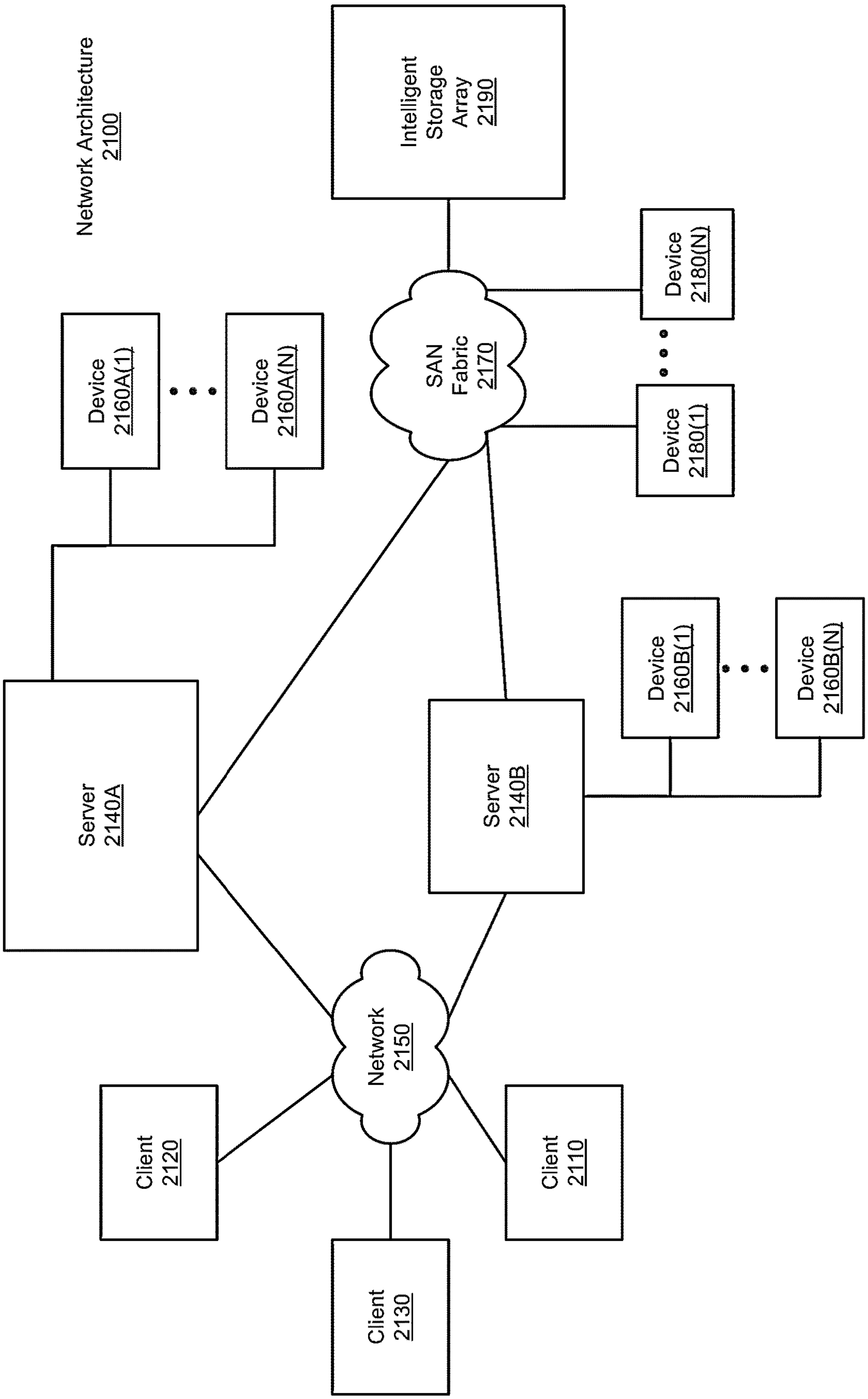
FIG. 21 is a block diagram depicting a network architecture suitable for implementing aspects of systems according to embodiments of systems such as those disclosed herein.

FIG. 21 is a block diagram depicting a network architecture 2100 in which client systems 2110, 2120 and 2130, as well as storage servers 2140A and 2140B (any of which can be implemented using computer system 2110), are coupled to a network 2150. Storage server 2140A is further depicted as having storage devices 2160A(1)-(N) directly attached, and storage server 2140B is depicted with storage devices 2160B(1)-(N) directly attached. Storage servers 2140A and 2140B are also connected to a SAN fabric 2170, although connection to a storage area network is not required for operation. SAN fabric 2170 supports access to storage devices 2180(1)-(N) by storage servers 2140A and 2140B, and so by client systems 2110, 2120 and 2130 via network 2150. An intelligent storage array 2190 is also shown as an example of a specific storage device accessible via SAN fabric 2170.

With reference to computer system 2010, modem 2047, network interface 2048 or some other method can be used to provide connectivity from each of client computer systems 2110, 2120 and 2130 to network 2150. Client systems 2110, 2120 and 2130 are able to access information on storage server 2140A or 2140B using, for example, a web browser or other client software (not shown). Such a client allows client systems 2110, 2120 and 2130 to access data hosted by storage server 2140A or 2140B or one of storage devices 2160A(1)-(N), 2160B(1)-(N), 2180(1)-(N) or intelligent storage array 2190. FIG. 21 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 2110). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
receiving subject information, wherein
the subject information is raw data and comprises
received identifying information, and
received subject data, and
the received identifying information and the received subject data are for a subject;
producing cleansed subject information, wherein
the producing the cleansed subject information comprises
retrieving existing identifying information and existing subject data from a subject information system database, wherein
the existing identifying information identifies a plurality of subjects, and
performing a data cleansing operation using the received identifying information and the existing identifying information, the data cleansing operation comprises
performing a fuzzy string matching operation between the received identifying information and the existing identifying information,
determining whether a result of the fuzzy string matching operation meets a match confidence level, and
in response to a determination that a result of the fuzzy string matching operation meets the match confidence level,
indicating that the received identifying information is sufficiently accurate to identify the subject as having a sufficient match confidence level;
identifying the subject as an identified subject based, at least in part, on the cleansed subject information; and
in response to a determination that the subject is the identified subject,
associating the received subject data with a subject record of the identified subject in the subject information system database, comprising importing at least a portion of the received subject data into the subject information system database.

2. The computer-implemented method of claim 1, wherein
the received identifying information comprises a plurality of pieces of information,
the data cleansing operation is performed for each piece of information of the plurality of pieces of information and results in one or more results for the each piece of information, and
each of the one or more results comprises a match score for the each piece of information, of a plurality of match scores for the plurality of pieces of information.

3. The computer-implemented method of claim 2, wherein
the fuzzy string matching operation comprises performing, as between the received identifying information and the existing identifying information, one or more of
a trigram similarity analysis, or
an Edit Distance analysis.

4. The computer-implemented method of claim 3, wherein
the Edit Distance analysis is one of
a Levenshtein Distance analysis, or
a Damerau-Levenshtein Distance analysis.

5. The computer-implemented method of claim 3, wherein
the fuzzy string matching operation further comprises performing one or more of natural language processing, a term frequency-inverse document frequency analysis, or
noise filtering.

6. The computer-implemented method of claim 2, further comprising:
performing an analysis as part of the identifying, wherein the analysis comprises
determining an overall match score of a plurality of overall match scores for each one of the plurality of subjects, using ones of the plurality of match scores, as between the received identifying information and the existing identifying information for the each one of the plurality of subjects,
determining whether a plurality of the plurality of overall match scores are in a central range,
in response to a determination that the plurality of the plurality of overall match scores are in the central range, determining a relative match score factor of a plurality of relative match score factors, for each of the plurality of the plurality of overall match scores, and
identifying the subject as the identified subject, wherein the identified subject has a corresponding relative match score factor of the plurality of relative match score factors that indicates the identified subject best matches the subject.

7. The computer-implemented method of claim 6, wherein
the analysis comprises a machine learning analysis operation,
the received identifying information comprises a first one or more attributes,
each of the first one or more attributes comprises a first attribute value of a plurality of attribute values,
the existing identifying information comprises a second one or more attributes, and
each of the second one or more attributes comprises a second attribute value of a plurality of attribute values.

8. The computer-implemented method of claim 2, wherein
the identifying is based, at least in part, on an analysis of the one or more results for the each piece of information and a corresponding matching confidence level for each of the one or more results, and
the subject is identified as the identified subject, if the analysis indicates that a corresponding matching confidence level of the subject meets a sufficient level of confidence for the each of the plurality of pieces of information.

9. The computer-implemented method of claim 8, further comprising:
retrieving existing subject data from a subject information system database, wherein
the existing subject data is subject data corresponding to the plurality of subjects; and
performing another fuzzy string matching operation between the received subject data and the existing subject data.

10. The method of claim 8, wherein
the received identifying information comprises at least one of
district student identifier of subject, or
state unique identifier of subject.

11. The computer-implemented method of claim 10, wherein
the received identifying information further comprises
a subject name,
a subject date of birth, and
demographic data, comprising at least one of
information regarding race,
information regarding ethnicity,
information regarding gender,
special education status, or
economic disadvantage status.

12. The computer-implemented method of claim 1, wherein
the importing results in data enhancement of the subject information system database by virtue of the subject information system database not already including at least one portion of the received subject data.

13. The computer-implemented method of claim 1, wherein
the subject information system database comprises
a subject table comprising the subject record,
a subject certification table, and
an extended subject certification table.

14. The computer-implemented method of claim 13, further comprising:
receiving a change proposal with regard to the identified subject, wherein
the receiving the change proposal identifies substantiating information;
performing an analysis of the received subject data and the substantiating information;
presenting a result of the analysis of the received subject data and the substantiating information; and
receiving an indication as to whether the change proposal should be approved based, at least in part, on the result of the analysis of the received subject data and the substantiating information.

15. The computer-implemented method of claim 14, wherein the subject information system database further comprises a subject certification data table, and the computer-implemented method further comprises:
updating an entry in the subject certification data table using at least one portion of the received subject data.

16. The computer-implemented method of claim 14, further comprising:
determining whether one or more criteria have been met;
in response to a determination that the one or more criteria have not been met, rejecting the change proposal; and
in response to a determination that the one or more criteria have been met, approving the change proposal.

17. The computer-implemented method of claim 16, wherein the subject information system database further comprises a subject certification data table and a certification table, and the computer-implemented method further comprises:
accepting the change proposal as an approved change proposal;
modifying a subject record of the identified subject as per the approved change proposal, wherein
the subject record is stored in the subject certification table; and
updating one or more other subject records affected by modification of the subject record, wherein
the one or more other subject records are stored in the extended subject certification table.

18. The method of claim 16, wherein the subject information system database further comprises a certification table, and the modifying the subject record of the identified subject comprises:
identifying an entry in the certification table by recording a certification identifier in the subject record.

19. A non-transitory computer-readable storage medium, comprising program instructions, which, when executed by one or more processors of a computing system, perform a method comprising:
receiving subject information, wherein
the subject information is raw data and comprises
received identifying information, and
received subject data, and
the received identifying information and the received subject data are for a subject;
producing cleansed subject information, wherein
the producing the cleansed subject information comprises
retrieving existing identifying information and existing subject data from a subject information system database, wherein
the existing identifying information identifies a plurality of subjects, and
performing a data cleansing operation using the received identifying information and the existing identifying information,
the data cleansing operation comprises
performing a fuzzy string matching operation between the received identifying information and the existing identifying information,
determining whether a result of the fuzzy string matching operation meets a match confidence level, and
in response to a determination that a result of the fuzzy string matching operation meets the match confidence level,
indicating that the received identifying information is sufficiently accurate to identify the subject as having a sufficient match confidence level;
identifying the subject as an identified subject based, at least in part, on the cleansed subject information; and
in response to a determination that the subject is the identified subject,
associating the received subject data with a subject record of the identified subject in the subject information system database, comprising importing at least a portion of the received subject data into the subject information system database.

20. The non-transitory computer-readable storage medium of claim 19, wherein
the received identifying information comprises a plurality of pieces of information,
the data cleansing operation is performed for each piece of information of the plurality of pieces of information and results in one or more results for the each piece of information,
each of the one or more results comprises a match score for the each piece of information, of a plurality of match scores for the plurality of pieces of information, and
the fuzzy string matching operation comprises performing, as between the received identifying information and the existing identifying information, one or more of
a trigram similarity analysis, or
an Edit Distance analysis.

21. The non-transitory computer-readable storage medium of claim 20, wherein the method further comprises:
performing an analysis as part of the identifying, wherein
the analysis comprises
determining an overall match score of a plurality of overall match scores for each one of the plurality of subjects, using ones of the plurality of match scores, as between the received identifying information and the existing identifying information for the each one of the plurality of subjects,
determining whether a plurality of the plurality of overall match scores are in a central range,
in response to a determination that the plurality of the plurality of overall match scores are in the central range, determining a relative match score factor of a plurality of relative match score factors, for each of the plurality of the plurality of overall match scores, and identifying the subject as the identified subject, wherein the identified subject has a corresponding relative match score factor of the plurality of relative match score factors that indicates the identified subject best matches the subject.

22. The non-transitory computer-readable storage medium of claim 20, wherein the identifying is based, at least in part, on an analysis of the one or more results for the each piece of information and a corresponding matching confidence level for each of the one or more results, the subject is identified as the identified subject, if the analysis indicates that a corresponding matching confidence level of the subject meets a sufficient level of confidence for the each of the plurality of pieces of information, and the method further comprises retrieving existing subject data from a subject information system database, wherein the existing subject data is subject data corresponding to the plurality of subjects; and performing another fuzzy string matching operation between the received subject data and the existing subject data.

23. A computing device comprising:

one or more hardware processors;

a storage device, communicatively coupled to the one or more hardware processors and comprising a subject information system database; and a computer-readable storage medium, communicatively coupled to the one or more hardware processors and comprising program instructions, which, when executed by the one or more hardware processors, perform a method comprising receiving subject information, wherein the subject information is raw data and comprises received identifying information, and received subject data, and the received identifying information and the received subject data are for a subject, producing cleansed subject information, wherein the producing the cleansed subject information comprises retrieving existing identifying information and existing subject data from the subject information system database, wherein the existing identifying information identifies a plurality of subjects, and performing a data cleansing operation using the received identifying information and the existing identifying information, the data cleansing operation comprises performing a fuzzy string matching operation between the received identifying information and the existing identifying information, determining whether a result of the fuzzy string matching operation meets a match confidence level, and in response to a determination that a result of the fuzzy string matching operation meets the match confidence level, indicating that the received identifying information is sufficiently accurate to identify the subject as having a sufficient match confidence level, identifying the subject as an identified subject based, at least in part, on the cleansed subject information, and in response to a determination that the subject is the identified subject, associating the received subject data with a subject record of the identified subject in the subject information system database, comprising importing at least a portion of the received subject data into the subject information system database.

* * * * *